US012441130B2

(12) United States Patent
Minemura et al.

(10) Patent No.: US 12,441,130 B2
(45) Date of Patent: Oct. 14, 2025

(54) RECORDING DEVICE

(71) Applicant: SEIKO EPSON CORPORATION, Tokyo (JP)

(72) Inventors: Hidefumi Minemura, Shiojiri (JP); Keisuke Sasaki, Matsumoto (JP); Narihiro Oki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 187 days.

(21) Appl. No.: 18/151,030

(22) Filed: Jan. 6, 2023

(65) Prior Publication Data

US 2023/0219355 A1 Jul. 13, 2023

(30) Foreign Application Priority Data

Jan. 7, 2022 (JP) ................................ 2022-001483

(51) Int. Cl.

| | |
|---|---|
| ***B41J 11/00*** | (2006.01) |
| ***B41J 2/01*** | (2006.01) |
| ***B41J 27/12*** | (2006.01) |
| ***B41J 29/38*** | (2006.01) |
| ***B65H 1/02*** | (2006.01) |

(Continued)

(52) U.S. Cl.

CPC ................ *B41J 27/12* (2013.01); *B41J 2/01* (2013.01); *B41J 11/00* (2013.01); *B41J 29/38* (2013.01); *B65H 1/025* (2013.01); *B65H 5/04* (2013.01); *B65H 7/20* (2013.01); *B65H 29/20* (2013.01); *B65H 31/02* (2013.01); *B65H 2301/4212* (2013.01); *B65H 2403/41* (2013.01); *B65H 2405/324* (2013.01); *B65H 2701/10* (2013.01); *B65H 2801/03* (2013.01); *B65H 2801/15* (2013.01)

(58) Field of Classification Search

CPC ..... B41J 27/12; B41J 29/38; B41J 2/01; B41J 11/00; B65H 5/04; B65H 7/20; B65H 2403/41; B65H 2301/4212; B65H 2405/324; B65H 2801/15; B65H 31/02; B65H 29/20; B65H 2701/10; B65H 2801/03; B65H 1/025

See application file for complete search history.

(56) References Cited

U.S. PATENT DOCUMENTS

| | | | | |
|---|---|---|---|---|
| 2018/0029393 A1* | 2/2018 | Matsumoto | ............ | B41J 25/006 |
| 2022/0063310 A1* | 3/2022 | Minemura | ........... | B41J 2/17509 |

FOREIGN PATENT DOCUMENTS

| | | |
|---|---|---|
| JP | 2018-016480 A | 2/2018 |
| JP | 2022-039300 A | 3/2022 |

* cited by examiner

*Primary Examiner* — Yaovi M Ameh

(74) *Attorney, Agent, or Firm* — WORKMAN NYDEGGER

(57) ABSTRACT

A recording device includes a medium receiving tray that receives a medium ejected by an ejection roller, the medium receiving tray being capable of taking a first state and a second state displaced from the first state in an ejection direction, a power transmission section that can take a power transmission state in which power of the motor is transmitted to the medium receiving tray and a power non-transmission state in which the power of the motor is not transmitted, the power transmission section including a friction gear as a power transmission path member, a switching lever section that moves the carriage to switch the power transmission section between the power non-transmission state and the power transmission state, and a holding portion that holds a position of the switching lever section.

17 Claims, 15 Drawing Sheets

(51) Int. Cl.

| | |
|---|---|
| ***B65H 5/04*** | (2006.01) |
| ***B65H 7/20*** | (2006.01) |
| ***B65H 29/20*** | (2006.01) |
| *B65H 31/02* | (2006.01) |

RECORDING DEVICE

The present application is based on, and claims priority from JP Application Serial Number 2022-001483, filed Jan. 7, 2022, the disclosure of which is hereby incorporated by reference herein in its entirety.

BACKGROUND

1. Technical Field

The present disclosure relates to a recording device that performs recording on a medium.

2. Related Art

Recording devices, such as facsimiles and printers, may be equipped with a medium receiving tray for receiving a medium that is recorded and ejected. Further, as disclosed in JP-A-2018-16480, there is a medium receiving tray that is configured to be switchable between an accommodated state and an unfolded state by a motor. In the recording device described in JP-A-2018-16480, power is transmitted from an ejection roller to an ejection tray as the medium receiving tray, and thus, the ejection tray is displaced.

In the configuration disclosed in JP-A-2018-16480, the ejection roller is provided with a gear for transmitting power, and this gear is called a trigger output gear. The trigger output gear is provided so as to be movable in an axial direction of the ejection roller by an operation of a carriage, and can be displaced by the operation of the carriage between a position where the trigger output gear meshes with a gear called an input gear and a position where the trigger output gear does not mesh with the input gear. When the ejection roller rotates while the trigger output gear and the input gear mesh with each other, power is transmitted from the ejection roller to the ejection tray, and thus, the ejection roller is displaced.

In a configuration in which a medium receiving tray is driven by a motor, in particular, in a configuration in which power is transmitted to the medium receiving tray from a motor for driving other components, such as the recording device described in JP-A-2018-16480, there is room for further improvement in the following points.

First, when power is not transmitted from a motor for driving other components to a medium receiving tray, since the medium receiving tray moves freely, there is a risk that the media receiving tray may move unintentionally when the device is tilted. Accordingly, it is desirable that the medium receiving tray has a configuration taking this point into account. Second, in case of a power transmission state in which power is transmitted from the motor for driving other components to the medium receiving tray, it is desirable to suppress a load applied to the motor as much as possible from the viewpoint of suppression of power consumption and the like.

SUMMARY

According to an aspect of the present disclosure, a recording device includes: a recording head that performs recording on a medium mounted on a carriage that reciprocates; an ejection roller that ejects the medium on which the recording is performed; a medium receiving tray that receives the medium ejected by the ejection roller, the medium receiving tray taking a first state and a second state displaced from the first state in an ejection direction of the medium; a motor that is a power source of the ejection roller; a power transmission section that takes a power transmission state in which power of the motor is transmitted from the motor to the medium receiving tray and a power non-transmission state in which the power of the motor is not transmitted from the motor to the medium receiving tray, the power transmission section including a friction gear as a power transmission path member; a switching lever section that switches the power transmission section between the power non-transmission state and the power transmission state by movement of the carriage; and a holding portion that holds a position of the switching lever section.

According to another aspect of the present disclosure, a recording device includes: a recording head that performs recording on a medium mounted on a carriage that reciprocates; an ejection roller that ejects the medium on which the recording is performed; a medium receiving tray that receives the medium ejected by the ejection roller, the medium receiving tray taking a first state and a second state displaced from the first state in an ejection direction of the medium; a motor that is a power source of the ejection roller; a power transmission section that takes a power transmission state in which power of the motor is transmitted from the motor to the medium receiving tray and a power non-transmission state in which the power of the motor is not transmitted from the motor to the medium receiving tray, the power transmission section including a friction gear as a power transmission path member; a switching lever section that switches the power transmission section between the power non-transmission state and the power transmission state by movement of the carriage; and a transmission direction switching section that switches the power transmission section between the power non-transmission state and the power transmission state by movement of the carriage in one direction, in which the transmission direction switching section is arranged upstream in a power transmission direction from the friction gear as the power transmission path member.

According to still another aspect of the present disclosure, a method of controlling a recording device is a method of controlling a recording device described in a fourteenth aspect to be described later. The method includes: rotating the shaft to make the switching lever section from a retracted state into an upright state; pushing the switching lever section in the upright state by the carriage to move the switching lever section to a position where the switching lever section is in the open power transmission state or a position where the switching lever section is in the closed power transmission state to perform each operation; and rotating the shaft in an opposite direction in a state in which the carriage is released from the switching lever section to return the switching lever section to the retracted state.

DESCRIPTION OF EXEMPLARY EMBODIMENTS

Figure 1:
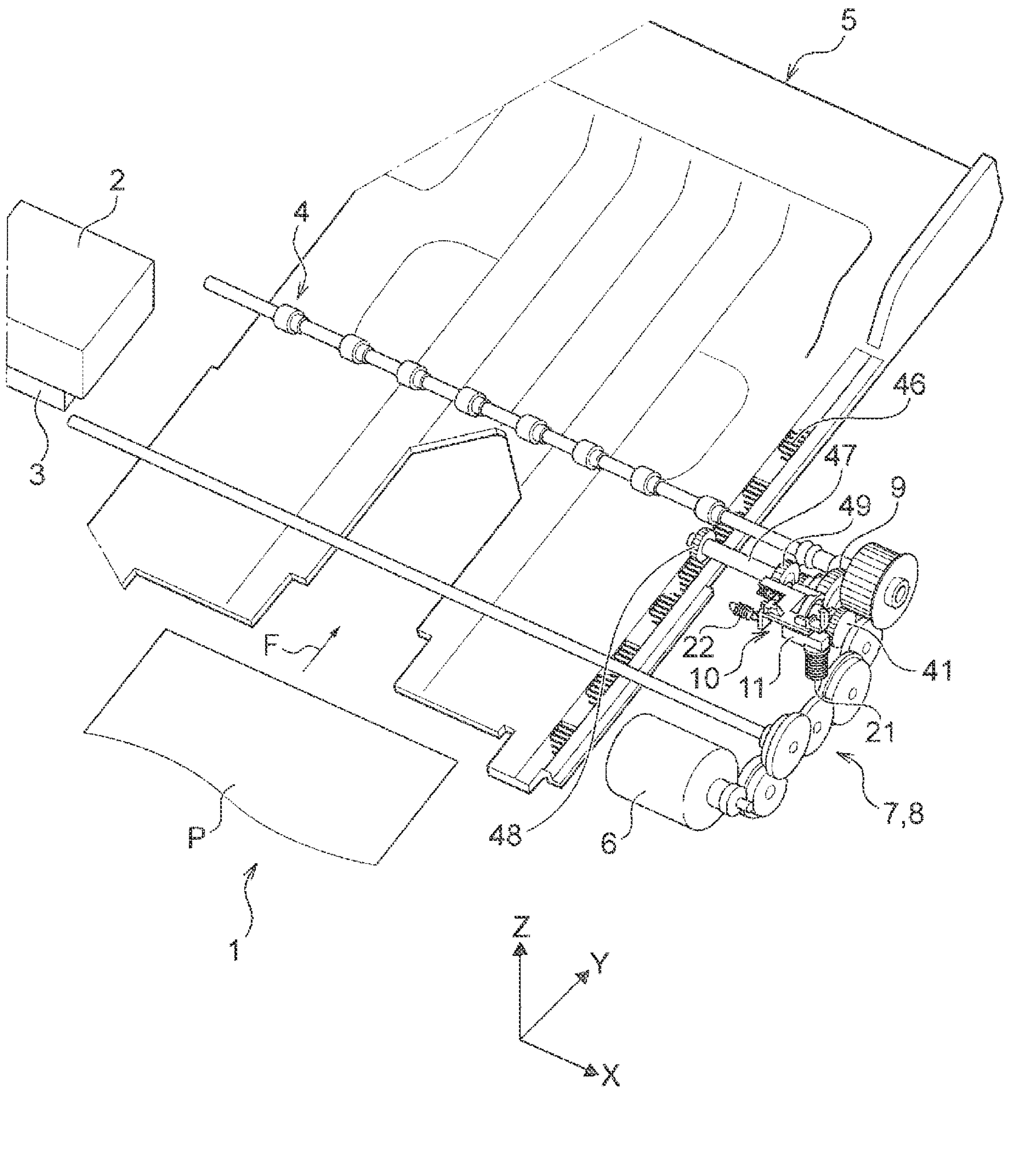
FIG. 1 is a perspective view of a main portion of a medium receiving tray portion of a recording device according to a first embodiment.

The present disclosure will first be described schematically below.

To solve the above problem, a recording device according to a first aspect of the present disclosure includes a recording head that performs recording on a medium mounted on a carriage that reciprocates; an ejection roller that ejects the medium on which the recording is performed; a medium receiving tray that receives the medium ejected by the ejection roller, the medium receiving tray taking a first state and a second state displaced from the first state in an ejection direction of the medium; a motor that is a power source of the ejection roller; a power transmission section that takes a power transmission state in which power of the motor is transmitted from the motor to the medium receiving tray and a power non-transmission state in which the power of the motor is not transmitted from the motor to the medium receiving tray, the power transmission section including a friction gear as a power transmission path member; a switching lever section that switches the power transmission section between the power non-transmission state and the power transmission state by movement of the carriage; and a holding portion that holds a position of the switching lever section.

According to an aspect of the present disclosure, the switching lever section receives the power of the carriage and moves to switch the power transmission section between the power non-transmission state and the power transmission state. A holding portion is provided to hold the position of the switching lever section. Therefore, since the position of the switching lever section is held by the holding portion, each of the power non-transmission state and the power transmission state of the power transmission section can be stably held.

In the first aspect, in the recording device according to a second aspect of the present disclosure, the switching lever section has a pin projecting toward the holding portion, the holding portion has a cam portion, and when the pin moves at the cam portion in one direction, the power transmission switching section switches between the power non-transmission state and the power transmission state.

According to an aspect of the present disclosure, the pin moves in one direction on the circumferential locus while coming into contact with the cam portion, thereby switching the power transmission section between the power non-transmission state and the power transmission state. As a result, the switching between the power non-transmission state and the power transmission state by the switching lever section can be realized with a simple configuration.

In the second aspect, in the recording device according to a third aspect of the present disclosure, the cam portion has a first cam position, a second cam position, a third cam position, and a fourth cam position on a circumferential locus, the cam portion is pushed by a spring member for the holding portion in a direction in which the cam portion maintains a contact state with the pin, and the cam portion is formed so that the pin is configured to move only in a direction of order of the first cam position, the second cam position, the third cam position, the fourth cam position, and the first cam position on the circumferential locus.

According to an aspect of the present disclosure, the cam portion is formed so that the pin is movable only in a direction of order of the first cam position, the second cam position, the third cam position, the fourth cam position, and again the first cam position on the circumferential locus. As a result, the switching between the power non-transmission state and the power transmission state by the switching lever section and the holding of each state can be realized with a simple configuration.

In the third aspect, in the recording device according to a fourth aspect of the present disclosure, the switching lever section moves by receiving power of the carriage and shifts from a state in which the pin comes into contact with the fourth cam position to a state in which the pin comes into contact with the first cam position and then a state in which the pin comes into contact with the second cam position, and after the switching lever section shifts to the state in which the pin comes into contact with the second cam position, when the switching lever section is released from the power of the carriage, the pin returns to the fourth cam position through the third cam position by a spring force of a spring member for the switching lever section.

According to an aspect of the present disclosure, the switching between the power non-transmission state and the power transmission state by the switching lever section and the holding of each state can be simply realized by the power of the carriage and the spring force of the spring member for the switching lever section.

In the fourth aspect, the recording device according to a fifth aspect of the present disclosure is configured so that the state in which the pin of the switching lever section comes into contact with the first cam position creates the power non-transmission state, and the state in which the pin comes into contact with the fourth cam position creates the power transmission state.

According to an aspect of the present disclosure, the recording device is configured so that the state in which the pin of the switching lever section comes into contact with the first cam position creates the power non-transmission state, and the state in which the pin comes into contact with the fourth cam position creates the power transmission state. As a result, the switching between the power non-transmission state and the power transmission state by the switching lever section and the holding of each state can be realized with a simple configuration.

In any one of first to fifth aspects, the recording device according to a sixth aspect of the present disclosure includes a rotation stopping section that moves, in the power non-transmission state, to a position where a rotation of the friction gear is stopped and is separated, in the power transmission state, from the position where the rotation of the friction gear is stopped.

According to an aspect of the present disclosure, a rotation stopping section that moves to a position where the rotation of the friction gear is stopped in the power non-transmission state and is separated from a position where the rotation of the friction gear is stopped in the power transmission state. As a result, since the rotation stopping section stops the rotation of the friction gear in the power non-transmission state, it is possible to reduce the possibility that the medium receiving tray unintentionally moves due to its own weight or other causes.

In the sixth aspect, the recording device according to a seventh aspect of the present disclosure includes a first rack portion that is provided in the switching lever section, a second rack portion that is provided in the rotation stopping section, and a release gear that meshes with the first rack portion and the second rack portion, in which, when the switching lever section is moved by the carriage to move the pin from the first cam position to the second cam position, movement of the first rack portion rotates the release gear, the rotation of the release gear moves the second rack portion in a direction opposite to a moving direction of the first rack portion to cause the rotation stopping section to be separated from a position where the rotation of the friction gear is stopped.

According to an aspect of the present disclosure, when the switching lever section moves by the carriage and the pin moves from the first cam position to the second cam position, the first rack portion rotates the release gear by the movement thereof. The rotation of the release gear causes the second rack portion to move in a direction opposite to the first rack portion, so the rotation stopping section is configured to be separated from the position where the rotation of the friction gear is stopped.

As a result, even if the spring force of the spring member for the switching lever section is set to be small, the power of the carriage can support the spring force, and increase certainty of separating the rotation stopping section from the position where the rotation of the friction gear is stopped.

In the seventh aspect, in the recording device according to an eighth aspect of the present disclosure, when the switching lever section is released from power of the carriage and the pin moves from the second cam position to the third cam position, the first rack portion rotates the release gear in an opposite direction, and the rotation of the release gear moves the second rack portion in an opposite direction to move the rotation stopping section to the position where the rotation of the friction gear is stopped, and when the pin moves from the third cam position to the fourth cam position, the first rack portion is separated from the release gear, and the second rack portion is pushed and moves by the switching lever section to cause the rotation stopping section to be separated from the position where the rotation of the friction gear is stopped.

According to an aspect of the present disclosure, when the pin moves from the second cam position to the third cam position, the first rack portion rotates the release gear in the opposite direction, and the rotation of the release gear moves the second rack portion in the opposite direction to move the rotation stopping section to the position where the rotation of the friction gear is stopped. In addition, when the pin moves from the third cam position to the fourth cam position, the first rack portion is separated from the release gear, and the second rack portion is pushed and moves by the switching lever section to cause the rotation stopping section to be separated from the position where the rotation of the friction gear is stopped.

As a result, even if the spring force of the spring member for the switching lever section is set to be small, the power of the carriage can support the spring force, and increase certainty of separating the rotation stopping section from the position where the rotation of the friction gear is stopped.

In the eighth aspect, the recording device according to a ninth aspect of the present disclosure includes a taper that is formed at a side surface of the second rack portion, and a contacted portion that takes, depending on a position where the second rack portion moves, a contact state in which the taper comes into contact and a non-contact state in which the taper does not come into contact, in which the taper is in the non-contact state in a state in which the pin is at the first cam position, and the taper is in the contact state in a state in which the pin is at the fourth cam position.

According to an aspect of the present disclosure, even if the rotation stopping section is displaced by an external force applied to the medium receiving tray, since one side of each taper of the second rack portion comes into contact with one side of the contacted portions and stops, it is possible to further suppress the displacement.

Further, in the displaced state, when the rotation stopping section is separated from the position where the rotation of the friction gear is stopped, since the power of the carriage supports the spring force of the spring member for the switching lever section, it is possible to cause the rotation stopping section to be separated from the friction gear without being affected by the displacement. The rotation stopping section moves in the separation direction and stops at a position where both sides of each taper of the second rack portion come into contact with the contacted portion. As a result, the displacement of the rotation stopping section is corrected. Therefore, when the rotation stopping section moves after the displacement of the rotation stopping section is corrected, the rotation stopping section can be performed without being affected by the lateral pressure.

A recording device according to a tenth aspect of the present disclosure includes a recording head that performs recording on a medium mounted on a carriage that reciprocates; an ejection roller that ejects the medium on which the recording is performed; a medium receiving tray that receives the medium ejected by the ejection roller, the medium receiving tray taking a first state and a second state displaced from the first state in an ejection direction of the medium; a motor that is a power source of the ejection roller; a power transmission section that takes a power transmission state in which power of the motor is transmitted from the motor to the medium receiving tray and a power non-transmission state in which the power of the motor is not transmitted from the motor to the medium receiving tray, the power transmission section including a friction gear as a power transmission path member; a switching lever section that switches the power transmission section between the power non-transmission state and the power transmission state by movement of the carriage; and a transmission direction switching section that switches the power transmission section between the power non-transmission state and the power transmission state by movement of the carriage in one direction, in which the transmission direction switching section is arranged upstream in a power transmission direction from the friction gear as the power transmission path member.

According to an aspect of the present disclosure, the switching lever section receives the power of the carriage and moves to switch the power transmission section between the power non-transmission state and the power transmission state. The recording device includes a transmission direction switching section that switches between the power non-transmission state and the power transmission state by moving the carriage in one direction, and the transmission direction switching section is provided upstream in the power transmission direction from the friction gear as the power transmission path member.

As a result, the switching between the power non-transmission state and the power transmission state can be realized with a simple configuration in which the carriage moves in one direction.

In the tenth aspect, in the recording device according to an eleventh aspect of the present disclosure, the transmission direction switching section is a compound gear that has a first gear and a second gear, the second gear always meshing with the friction gear, and movement of the switching lever section moves a drive gear that transmits the power of the motor and the transmission direction switching section takes, depending on a position of the drive gear, the power non-transmission state, an open power transmission state for moving the medium receiving tray in a direction from the first state to the second state, and a closed power transmission state for moving the medium receiving tray in a direction from the second state to the first state.

According to aspect of the present disclosure, the transmission direction switching section is the compound gear that has the first gear and the second gear, in which the second gear always meshes with the friction gear. The transmission direction switching section is configured to move the switching lever to move the drive gear that transmits the power of the motor and takes the power non-transmission state depending on a position of the drive gear, an open power transmission state for moving the medium receiving tray in a direction from the first state to the second state, and a closed power transmission state for moving the medium receiving tray in a direction from the second state to the first state.

As a result, the switching between the power non-transmission state and the power transmission state by the power transmission switching section can be realized with a simple configuration of the compound gear. In addition, the power non-transmission state, the open power transmission state, and the closed power transmission state can be easily realized depending on the position of the drive gear.

In the eleventh aspect, in the recording device in accordance with a twelfth aspect of the present disclosure, the switching lever section is pushed by a first spring and a second spring located on both sides in the moving direction, the drive gear is located between the switching lever section and the second spring and is pushed to the switching lever section by the second spring, and a spring force of the first spring is greater than a spring force of the second spring.

According to an aspect of the present disclosure, the switching lever section is pushed by the first spring and the second spring located on both sides in the moving direction. The spring force of the first spring is greater than that of the second spring. As a result, when the switching lever section is released from the power of the carriage, the switching lever section can be automatically return to the position in which the power is not transmitted by the spring force of the first spring.

In the twelfth aspect, in the recording device according to a thirteenth aspect of the present disclosure, the rotation stopping section configured to move is provided between the first spring and the switching lever, and the rotation stopping section is pushed to the switching lever by the first spring, and moves, in the power non-transmission state, to a position where the rotation stopping section meshes with the first gear of the compound gear and moves, in the power transmission state, to a position where the rotation stopping section does not mesh with the first gear.

According to an aspect of the present disclosure, the rotation stopping section is movably provided between the first spring and the switching lever section. The rotation stopping section is pushed to the switching lever section by the first spring, moves to a position where the rotation stopping section meshes with the first gear of the compound gear in the power non-transmission state, and moves to a position where the rotation stopping section does not mesh with the first gear in the power transmission state. As a result, since the rotation stopping section moves to a position where the rotation stopping section meshes with the first gear of the compound gear in the power non-transmission state to stop the rotation of the compound gear, it is possible to reduce the risk that the medium receiving tray unintentionally moves due to its own weight or other causes.

In the twelfth aspect or the thirteenth aspect, in the recording device according to a fourteenth aspect of the present disclosure, the switching lever section is configured to rotate around a shaft while being configured to move to the shaft by receiving power of the carriage in a state in which the switching lever section is pushed from both sides in the moving direction by the first spring and the second spring, and integrally rotates by a frictional force when the shaft rotates.

According to an aspect of the present disclosure, the switching lever section is rotatable around the shaft, and rotates integrally by a frictional force when the shaft rotates. As a result, a carriage contact portion of the switching lever section that is pushed by the carriage can be arranged within an operation range of the carriage. Therefore, it is possible to suppress an increase in size in a width direction of the recording device.

Specifically, the carriage contact portion can be arranged in a movement range when the carriage moves outside a range during the recording operation for re-recognizing a self-position other than during the recording operation, for example. When the medium receiving tray is operated in the open power transmission state or the closed power transmission state, the carriage comes into contact with the carriage contact portion by setting the switching lever section to an upright state. On the other hand, when the carriage performs the operation of re-recognizing the self-position or the like, the shaft rotates in the opposite direction to rotate the switching lever section together, and the switching lever section is tilted from the upright state to the retracted state and the carriage contact portion is in a state where the carriage contact portion does not come into contact with the carriage.

A method of controlling a recording device according to an aspect of the present disclosure is a method of controlling the recording device described in the fourteenth aspect. The method includes: rotating the shaft to make the switching lever section from a retracted state into an upright state, pushing the switching lever section in the upright state by the carriage to move the switching lever section to a position where the switching lever section is in the open power transmission state or a position where the switching lever section is in the closed power transmission state to perform each operation, and rotating the shaft in an opposite direction in a state in which the carriage is released from the switching lever section to return the switching lever section to the retracted state.

According to the aspect of the present disclosure, the same effects as those of the fourteenth aspect can be obtained.

First Embodiment

Hereinafter, a recording device according to a first embodiment will be specifically described below with reference to FIGS. 1 to 10B.

In the following description, three mutually orthogonal axes are an X-axis, a Y-axis, and a Z-axis, respectively, as illustrated in each drawing. A Z-axis direction corresponds to a vertical direction, that is, a direction in which gravity acts. An X-axis direction and a Y-axis direction correspond to a horizontal direction. In each drawing, a direction indicated by the arrows of the three axes (X, Y, Z) is a +direction of each direction.

As illustrated in FIGS. 1 to 3B, a recording device 1 according to the present embodiment includes a recording head 3 that performs recording on a medium P mounted on a reciprocating carriage 2, an ejection roller 4 that ejects the recorded medium P, and a medium receiving tray 5 that receives the medium P ejected by the ejection roller 4. The medium receiving tray 5 can take a first state and a second state displaced in an ejection direction F of the medium P from the first state.

FIG. 1 illustrates a state in which the medium receiving tray 5 starts moving from the first state corresponding to a state in which the medium receiving tray 5 is accommodated in the recording device 1 and is sent out of the recording device 1 on the way to the second state corresponding to a position at which the medium receiving tray 5 is capable of receiving the medium P.

Furthermore, the recording device 1 includes a motor 6 which is the power source of the ejection roller 4 and a power transmission section 7. The power transmission section 7 is configured to take a power transmission state in which the power of the motor 6 is transmitted to the medium receiving tray 5 and a power non-transmission state in which the power of the motor 6 is not transmitted from the motor 6 to the medium receiving tray 5. The power transmission section 7 includes a friction gear 9 as a power transmission path member 8.

Furthermore, the recording device 1 includes a switching lever section 10 which receives the power of the carriage 2 and moves to switch the power transmission section 7 between the power non-transmission state and the power transmission state, and a holding portion 11 which holds the position of the switching lever section 10. The switching lever section 10 is attached to a shaft 27 (FIGS. 3A to 4B) described later so as to be movable in the axial direction (X-axis direction). The shaft 27 has a transmission gear 41 forming a transmission gear group as the power transmission path member 8, and is attached to a structural member (not illustrated) such as a frame of the recording device 1 so as to be rotatable around an axis.

Although the recording device 1 according to the present embodiment is an ink jet printer, it goes without saying that the recording device 1 is not limited to the ink jet printer.

Figure 4A:
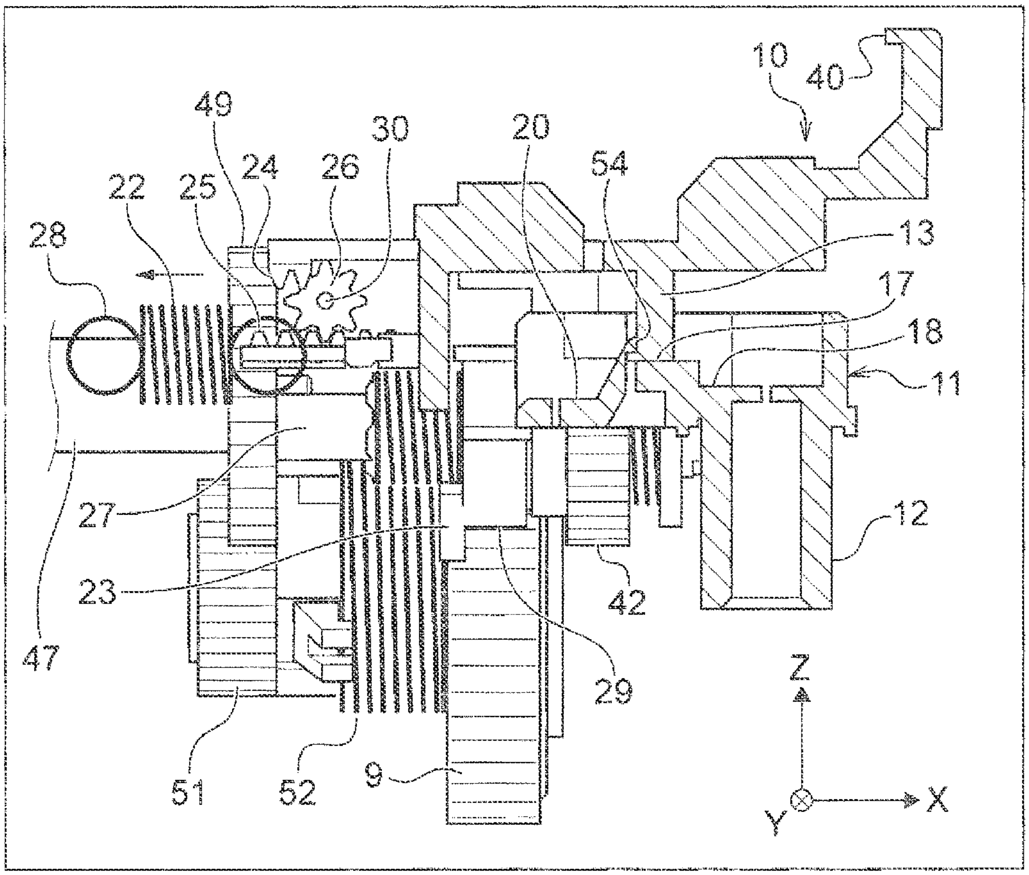
FIGS. 4A and 4B are a partial cross-sectional view of the switching lever section and a perspective view of a holding portion according to the first embodiment.
Figure 4B:
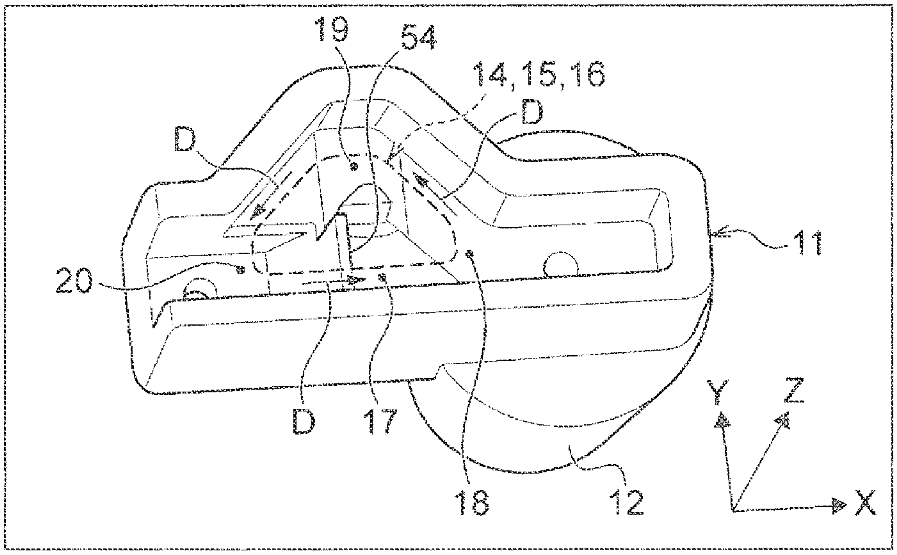
Figure 5:
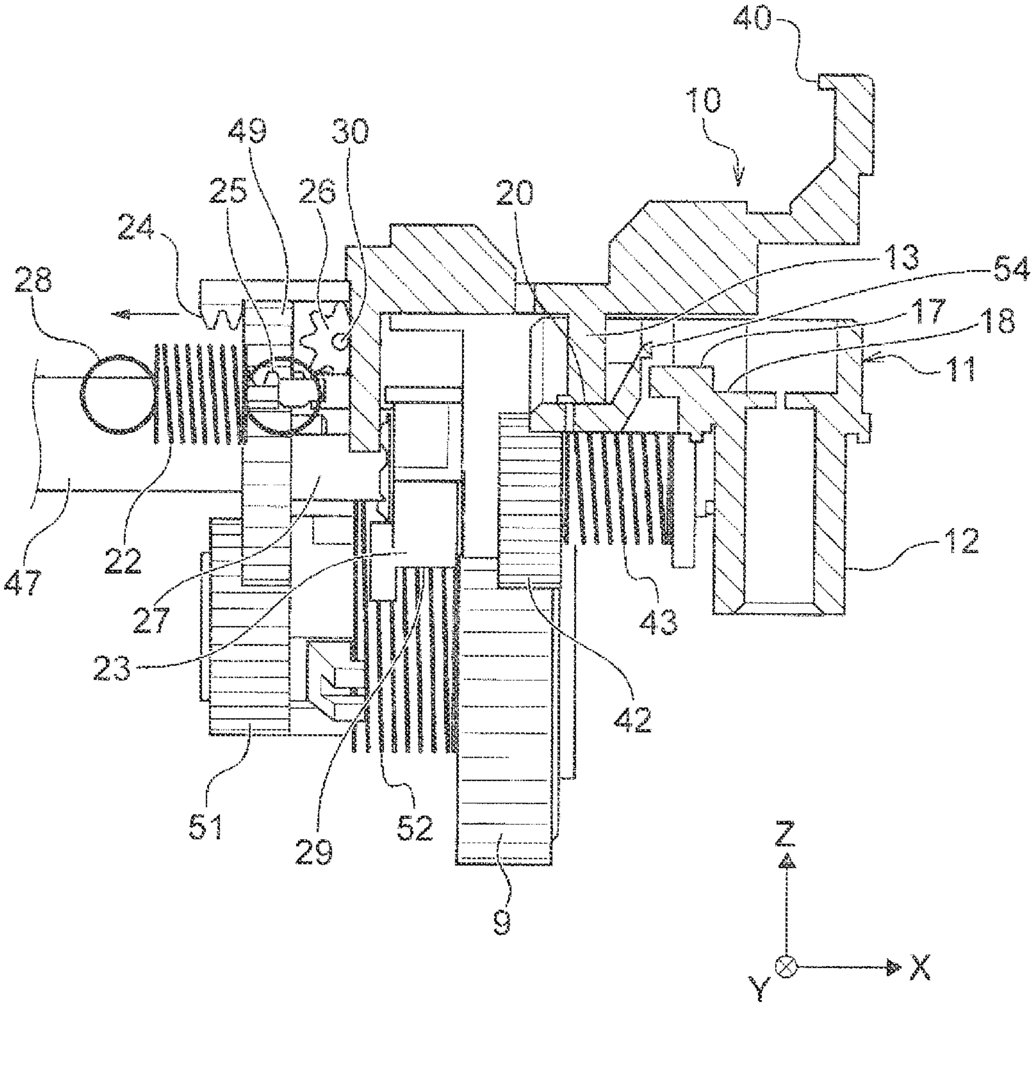
FIG. 5 is a partial cross-sectional view of the switching lever section according to the first embodiment.

As illustrated in FIGS. 4A to 5, in the present embodiment, the switching lever section 10 has a pin 13 protruding toward the holding portion 11.

As illustrated in FIG. 4B, the holding portion 11 has a cam portion 16 having a cam surface 15 on one circumferential locus 14. By moving the pin 13 in one direction D on the circumferential locus 14 in a state where the pin 13 comes into contact with the cam surface 15 of the cam portion 16, the power transmission section 7 is switched between the power non-transmission state and the power transmission state.

Figure 2A:
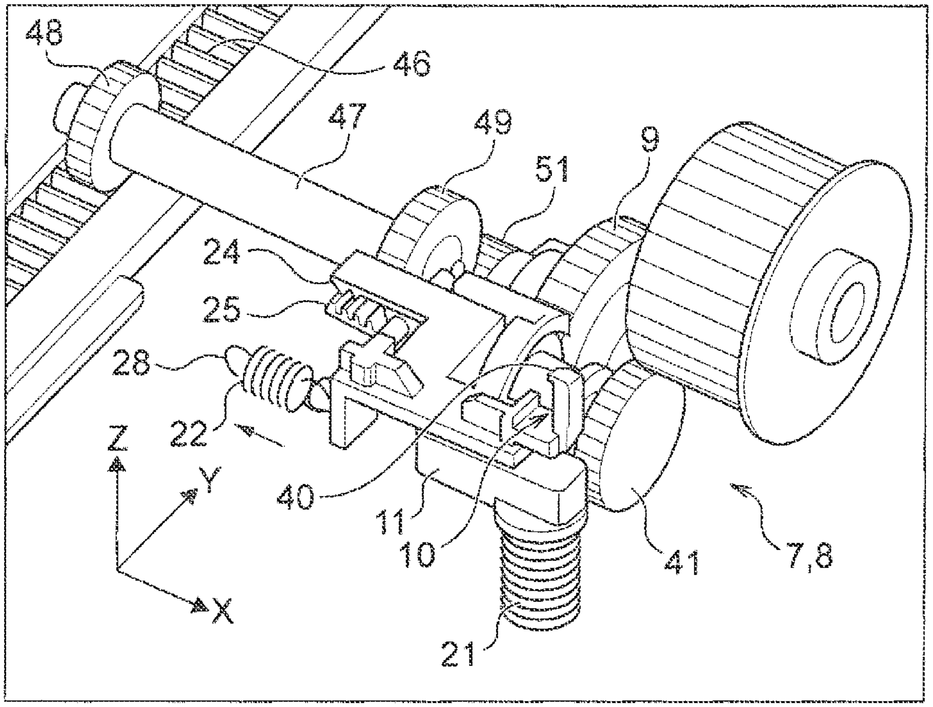
FIGS. 2A and 2B are an enlarged perspective view and partial cross-sectional view of a switching lever section according to the first embodiment.
Figure 2B:
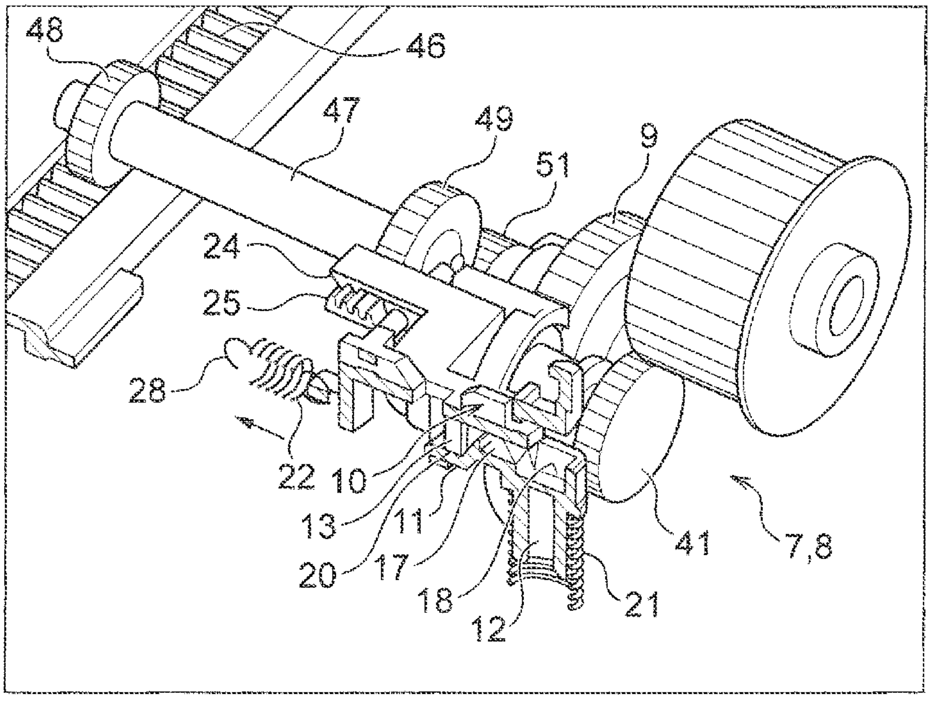
Figure 3A:
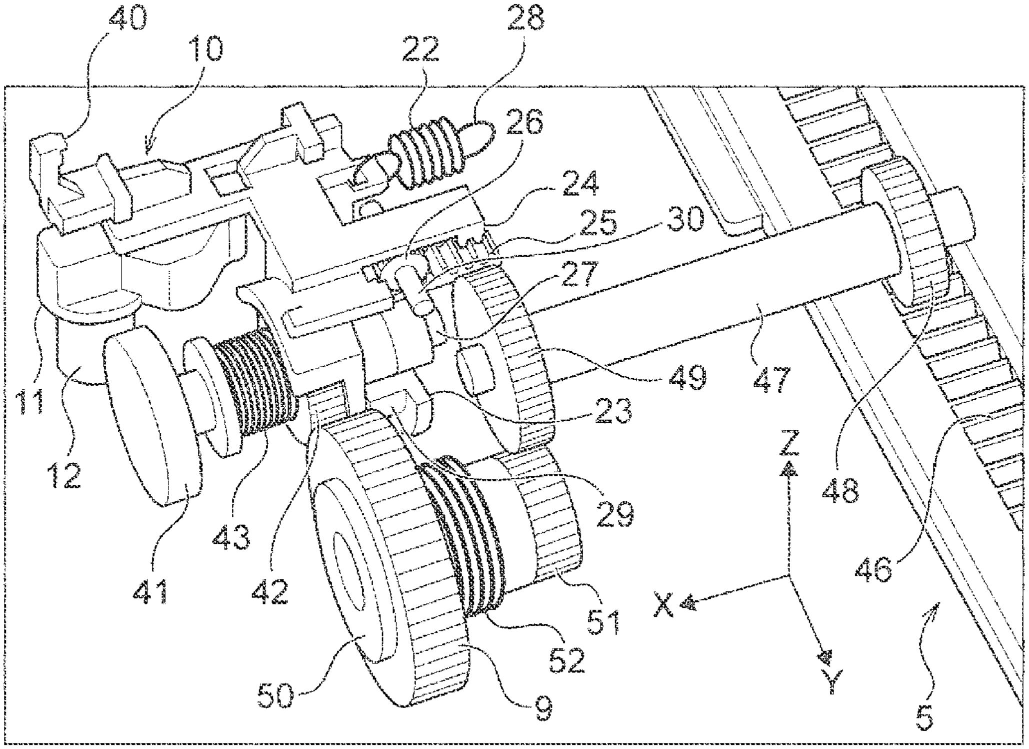
FIGS. 3A and 3B are a partial enlarged perspective view of the switching lever section and an enlarged perspective view of a rotation stopping section according to the first embodiment.
Figure 3B:
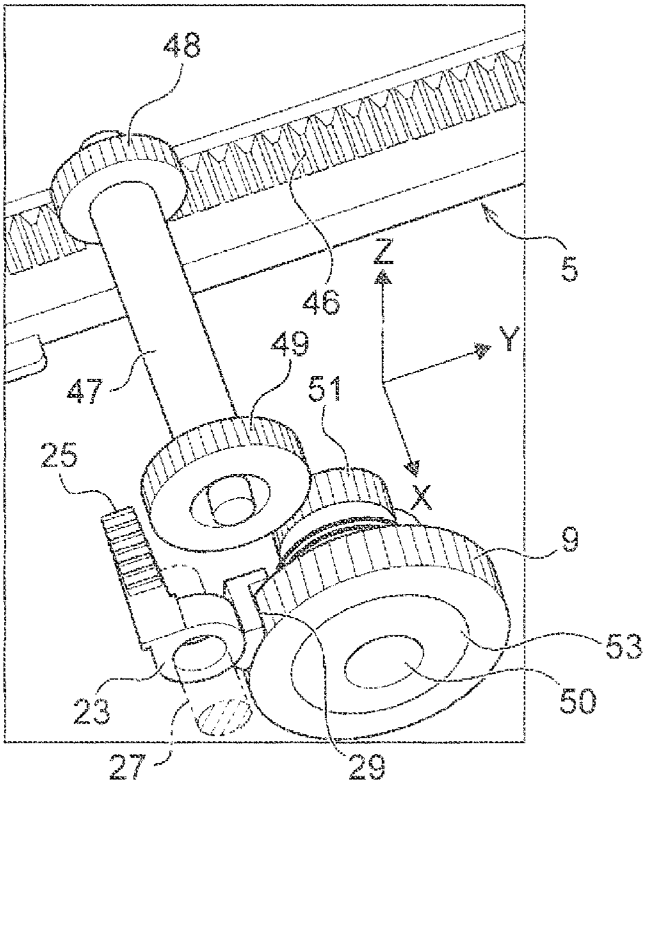

In addition, in the present embodiment, the cam portion 16 of the holding portion 11 has a first cam position 17, a second cam position 18, a third cam position 19, and a fourth cam position 20 on the circumferential locus 14. Further, as illustrated in FIGS. 2A and 2B, the cam portion 16 is pushed by a spring member 21 for the holding portion in a direction in which the cam portion 16 maintains contact with the pin 13. That is, the holding portion 11 is provided on the structural member so as to be movable in an up-down direction (Z-axis direction), and is pushed upward (+Z direction) from below by the spring member 21 for the holding portion so as to be in constant contact with the pin 13. Here, the spring member 21 for the holding portion is a coil spring, and is provided in the lower portion of the holding portion 11 so as to surround a cylindrical portion 12 protruding downward (−Z direction).

As illustrated in FIG. 4B, the cam portion 16 is formed so that the pin 13 can move on the circumferential locus 14 only in the direction D in the order of the first cam position 17, the second cam position 18, the third cam position 19, the fourth cam position 20, and then the first cam position 17. During the movement on the circumferential locus 14, the holding portion 11 moves up and down due to a spring force of the spring member 21 for the holding portion.

Further, according to the present embodiment, the switching lever section 10 receives the power of the carriage 2 and moves in the +X direction, transfers from the state (FIG. 5) in which the pin 13 comes into contact with the fourth cam position 20 to the state (FIG. 4A) in which the pin 13 comes into contact with the first cam position 17, and then transfers to the state in which the pin 13 comes into contact with the second cam position 18.

After moving to the state in which the pin 13 comes into contact with the second cam position 18, when the power of the carriage 2 is released, the pin 13 passes through the third cam position 19 and returns to the fourth cam position 20 due to a spring force of a spring member 22 for the switching lever section directed in the −X direction. A base end 28 of the spring member 22 for the switching lever section is attached to be hooked to the structural member. Therefore, when the carriage 2 is separated from the switching lever section 10, the pin 13 passes through the third cam position 19 and returns to the fourth cam position 20 as described above due to the spring force of the spring member 22 for the switching lever section directed in the −X direction.

According to the present embodiment, the power non-transmission state is created when the pin 13 of the switching lever section 10 comes into contact with the first cam position 17 of the cam portion 16 of the holding portion 11 (FIG. 4A). The state (FIG. 5) in which the pin 13 of the switching lever section 10 comes into contact with the fourth cam position 20 is configured to create the power transmission state.

Further, as illustrated in FIGS. 3A and 3B and 4A to 7B, according to the present embodiment, a rotation stopping section 23 is provided, which moves to a position at which the rotation of the friction gear 9 is stopped in the power non-transmission state and is separated from the position at which the rotation of the friction gear 9 is stopped in the power transmission state. The rotation stopping section 23 is attached to the shaft 27 so as to move integrally with the switching lever section 10. The rotation stopping section 23 is attached to the shaft 27 in a state in which the rotation about the shaft is restricted, that is, in a state in which the rotation stopping section 23 does not rotate.

The rotation stopping section 23 has a locking tooth 29. When the locking tooth 29 moves integrally with the switching lever section 10 (in the X-axis direction) and reaches the position of the friction gear 9, the locking tooth 29 meshes with the friction gear 9 (FIG. 4A). The non-rotating rotation stopping section 23 meshes with the friction gear 9 to stop unnecessary rotation of the friction gear 9.

Further, as illustrated in FIGS. 3A and 3B, and 4A to 7B, according to the present embodiment, the switching lever section 10 is provided with a first rack portion 24, and the rotation stopping section 23 is provided with a second rack portion 25. A release gear 26 is provided between the first rack portion 24 and the second rack portion 25 so as to mesh with both of them.

The release gear 26 is rotatably mounted on a shaft 30. The shaft 30 is fixed to the structural member.

Figure 6A:
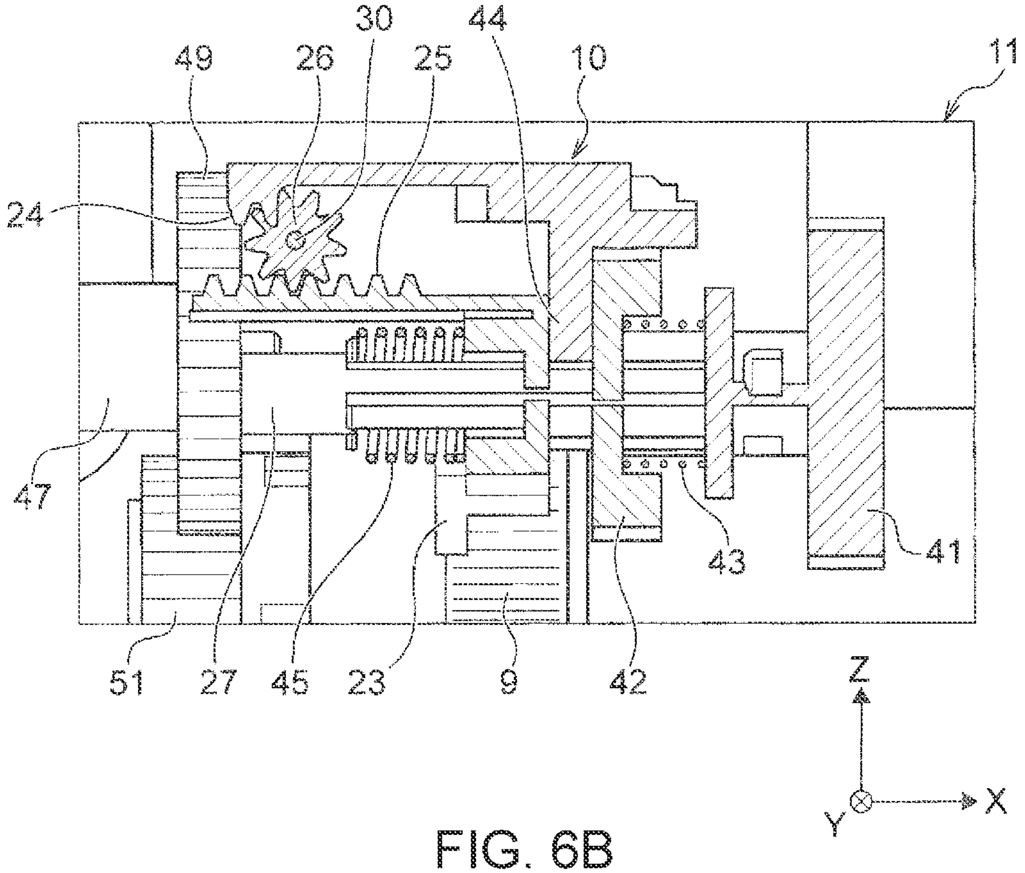
FIGS. 6A and 6B are partial cross-sectional views of the switching lever section according to the first embodiment.
Figure 6B:
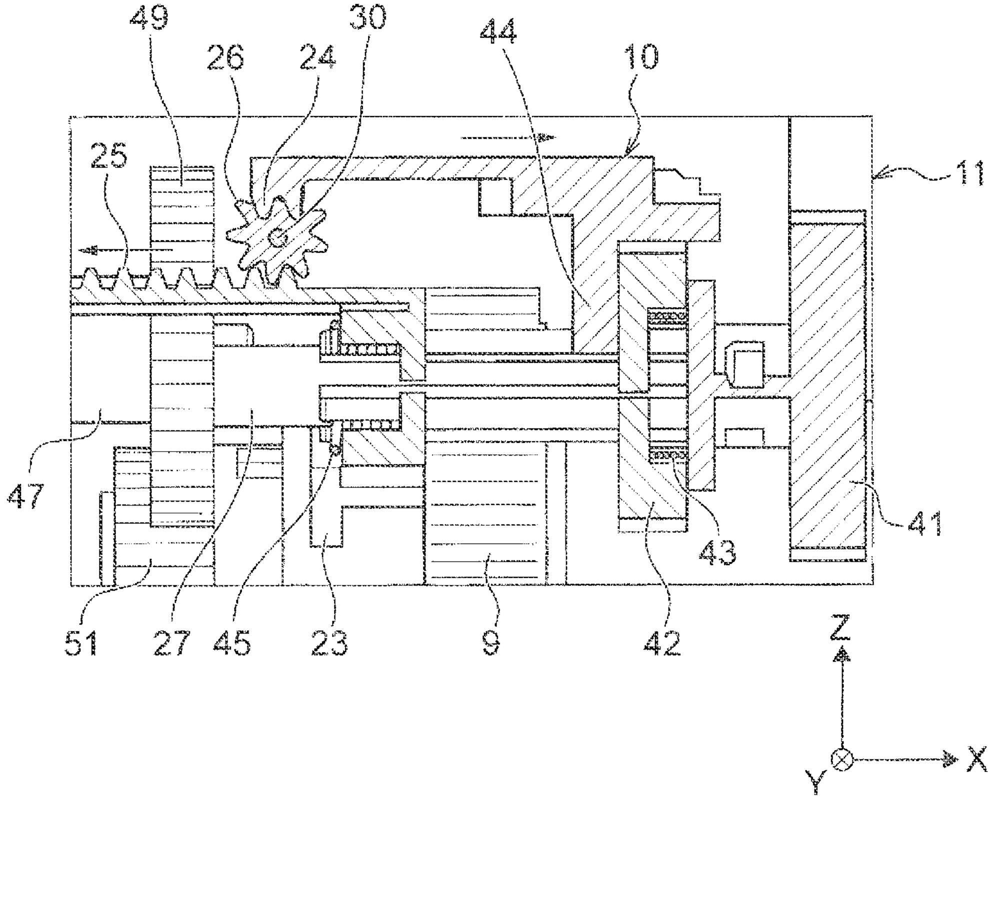

As illustrated in FIGS. 6A and 6B, when the switching lever section 10 moves (+X direction) by the carriage 2 and the pin 13 moves from the first cam position 17 (FIG. 6A) to the second cam position 18 (FIG. 6B), the switching lever section 10 rotates the release gear 26 by the movement (+X direction) of the first rack portion 24. The rotation of the release gear 26 causes the second rack portion 25 to move in a direction (−X direction) opposite to the moving direction of the first rack portion 24. This movement in the opposite direction separates the rotation stopping section 23 from the position where the rotation of the friction gear 9 is stopped.

That is, although the description is partially repeated, when the switching lever section 10 moves by the carriage 2 against the spring force of the spring member 22 for the switching lever section and the pin 13 moves to the first cam position 17 (FIG. 6A) to the second cam position 18 (FIG. 6B), the first rack portion 24 rotates the release gear 26 by the movement (+X direction). Then, the rotation of the release gear 26 causes the second rack portion 25 to move in the direction (−X direction) opposite to the moving direction of the first rack portion 24, thereby separating the rotation stopping section 23 from the position where the rotation of the friction gear 9 is stopped.

Figure 7A:
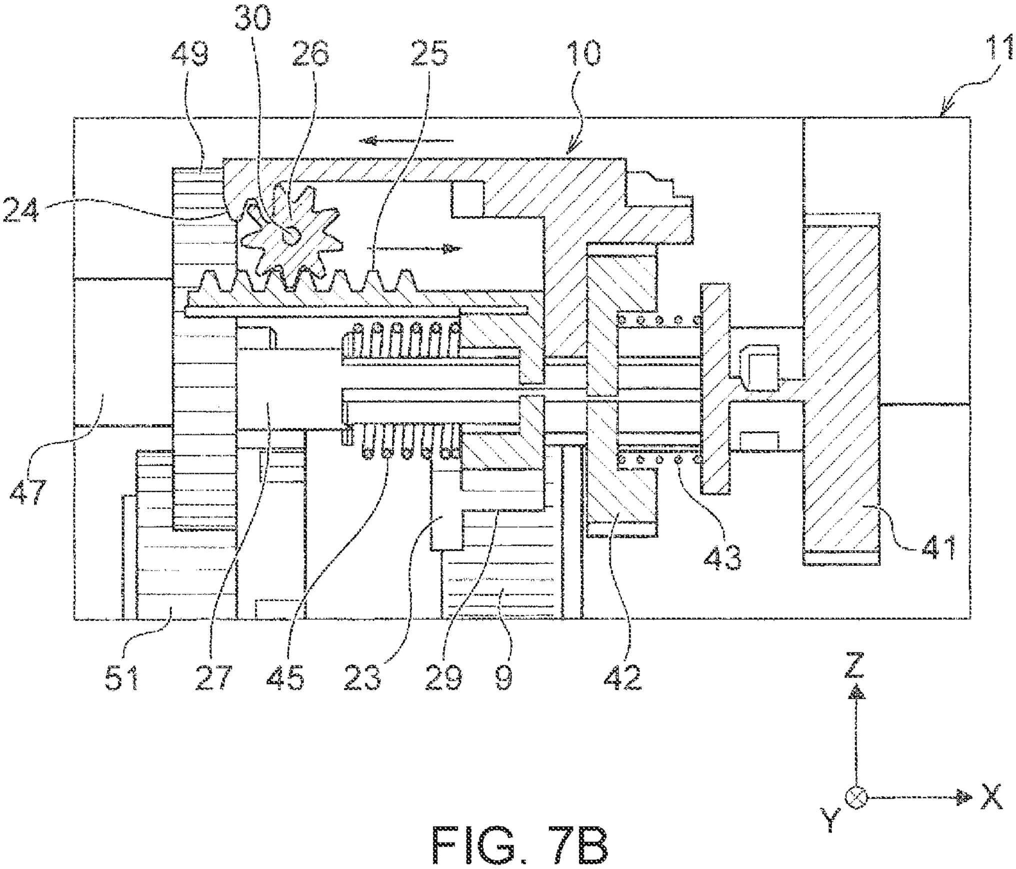
FIGS. 7A and 7B are partial cross-sectional views of the switching lever section according to the first embodiment.
Figure 7B:
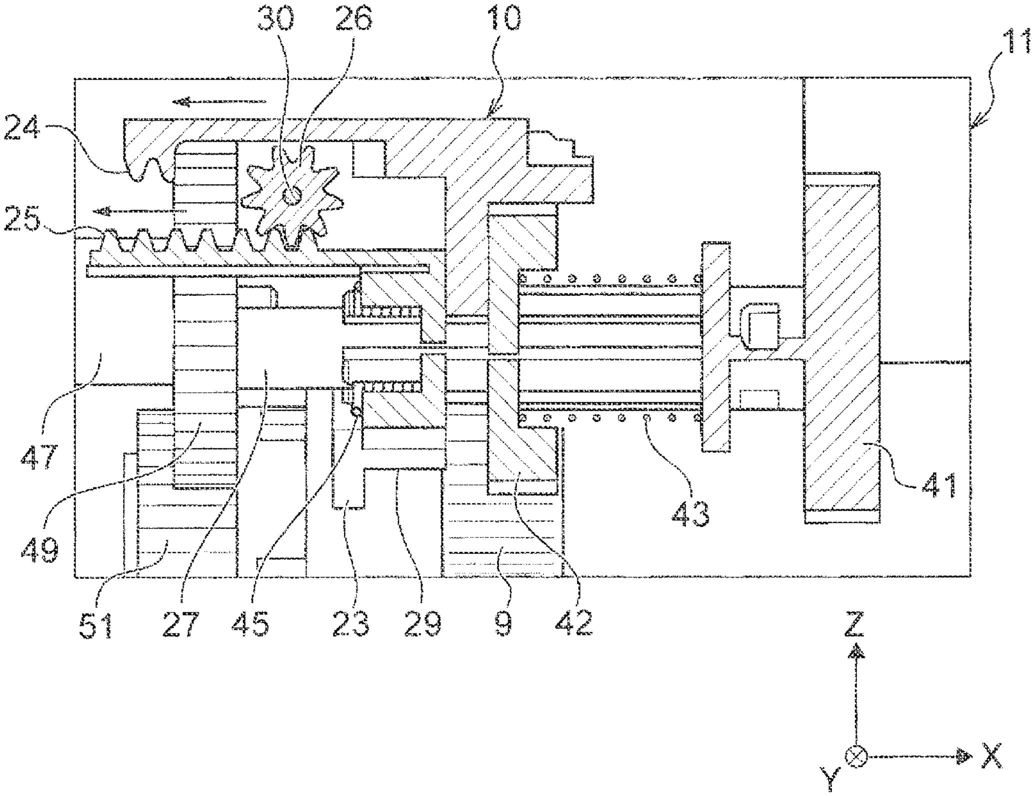

In addition, as illustrated in FIGS. 7A and 7B, according to the present embodiment, when the switching lever section 10 is released from the power of the carriage 2 and the pin 13 moves (−X direction) from the second cam position 18 to the third cam position 19 by the spring force of the spring member 22 for the switching lever section, the first rack portion 24 rotates the release gear 26 in the opposite direction, and the rotation of the release gear 26 causes the second rack portion 25 to move in the opposite direction (+X direction) to move the rotation stopping section 23 to the position where the rotation of the friction gear 9 is stopped.

Furthermore, when the pin 13 moves (−X direction) from the third cam position 19 to the fourth cam position 20, the first rack portion 24 separates from the release gear 26, the second rack portion 25 is pushed and moves by the switching lever section 10, and thus, separates the rotation stopping section 23 from the position where the rotation of the friction gear 9 is stopped. Here, the first rack portion 24 is formed to have a length shorter than that of the second rack portion 25. As a result, when the pin 13 moves from the third cam position 19 to the fourth cam position 20, the first rack portion 24 is separated from the release gear 26, and the second rack portion 25 is pushed and moves by the switching lever section 10.

Further, as illustrated in FIGS. 8A to 10B, according to the present embodiment, tapers 31 and 32 are formed at side surfaces of the second rack portion 25. Furthermore, there are provided contacted portions 34 and 35 that take, depending on the position to which the second rack portion 25 moves, a contact state in which the tapers 31 and 32 come into contact with the contacted portions 34 and 35, respectively, and a non-contact state in which the tapers 31 and 32 do not come into contact with the contacted portions 34 and 35, respectively.

The tapers 31 and 32 are in the non-contact state when the pin 13 is in the first cam position 17, and the tapers 31 and 32 are in the contact state when the pin 13 is in the fourth cam position 20.

Figure 8A:
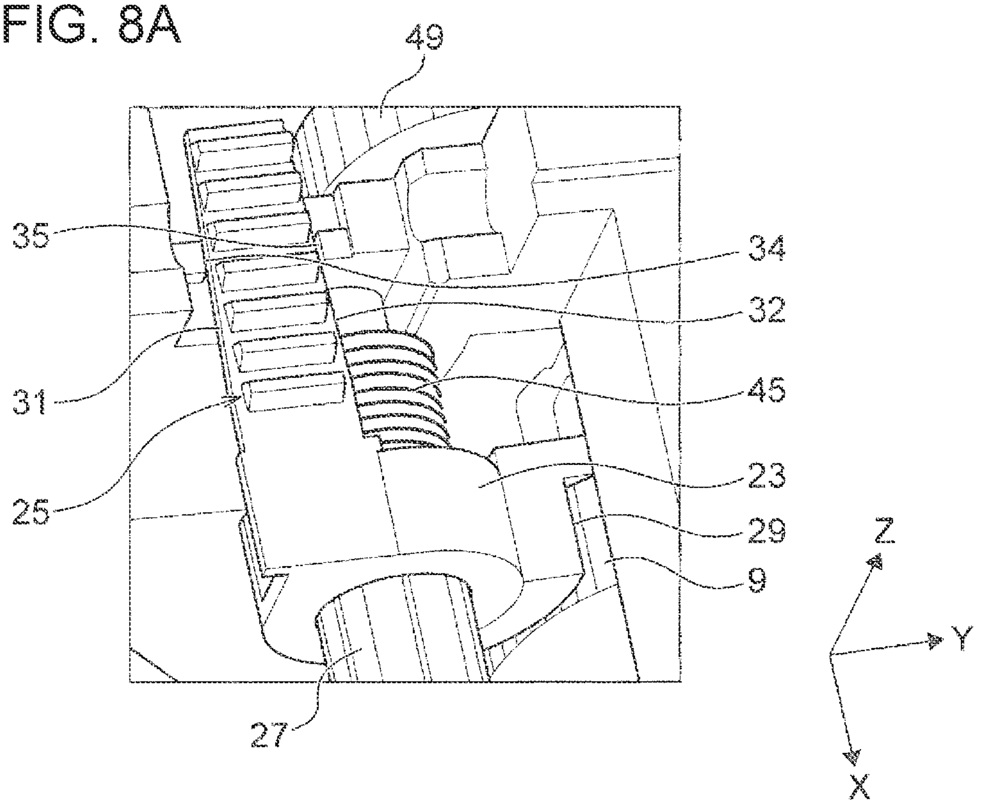
FIGS. 8A and 8B are a perspective view and an enlarged perspective view of a main portion of the rotation stopping section according to the first embodiment.
Figure 8B:
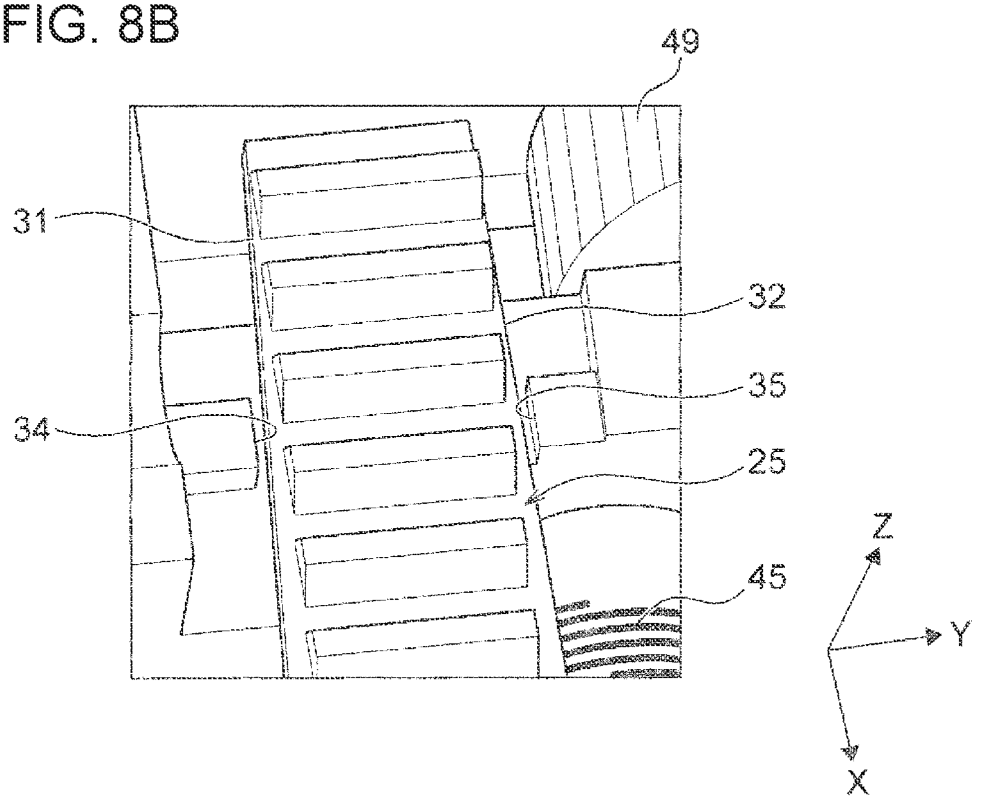

When an external force is applied to the medium receiving tray 5 in a state where the pin 13 is in the first cam position 17, that is, the rotation stopping section 23 is in a position to stop the rotation of the friction gear 9, a rotational force acts on the friction gear 9 due the external force. As a result, a lateral pressure is generated between the friction gear 9 and the locking teeth 29 of the rotation stopping section 23, and a displacement force that displaces the rotation stopping section 23 may act. When the external force is not applied, the tapers 31 and 32 of the second rack portion 25 are in a non-contact state with the contacted portions 34 and 35 (FIGS. 8A and 8B). However, when the external force is applied, the rotation stopping section 23 may be displaced by the displacement force.

According to the present embodiment, even when the rotation stopping section 23 is displaced by the external force, one of the tapers 31 and 32 of the second rack portion 25 comes into contact with one of the contacted portions 34 and 35 (FIG. 9A) and stops. That is, further displacement is suppressed.

Figure 9A:
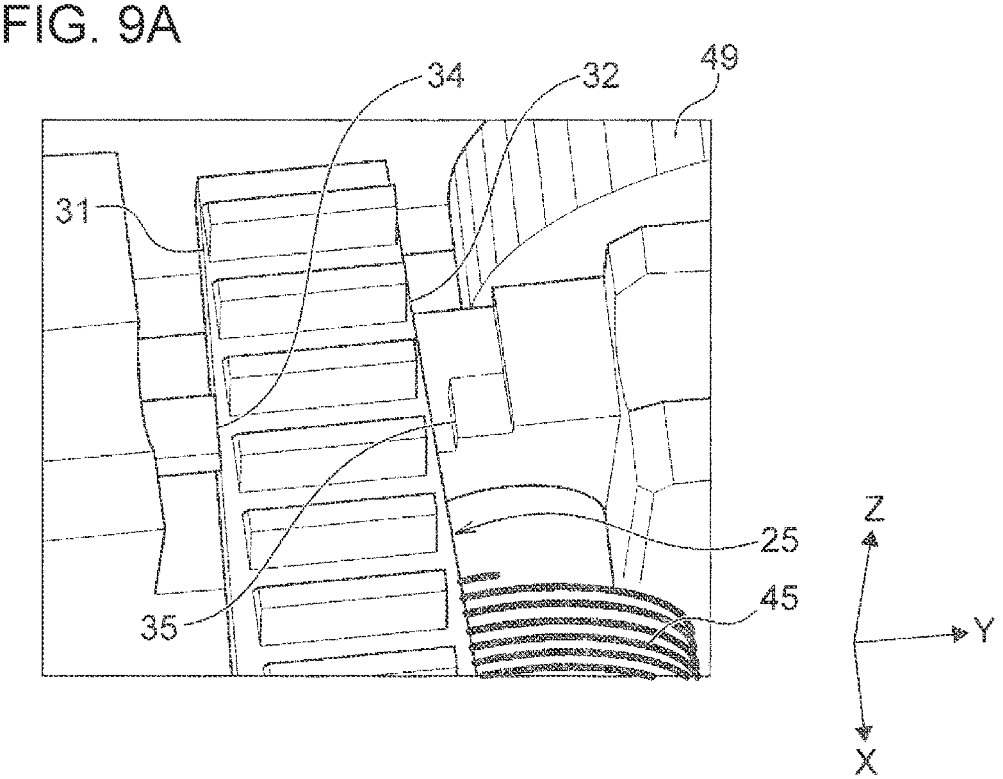
FIGS. 9A and 9B are a perspective view and an enlarged perspective view of a main portion of the rotation stopping section according to the first embodiment.
Figure 9B:
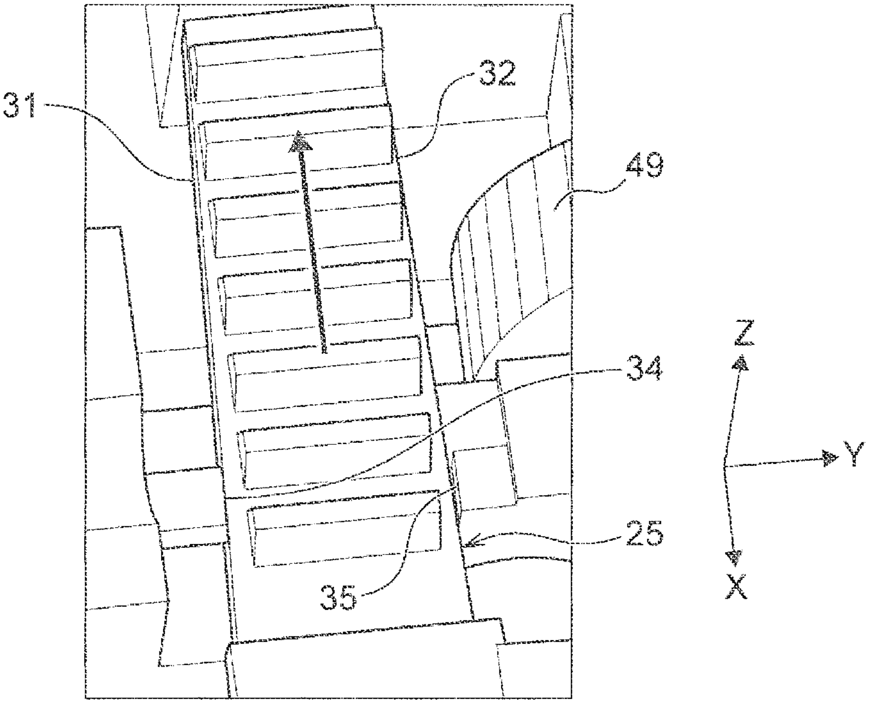
Figure 10A:
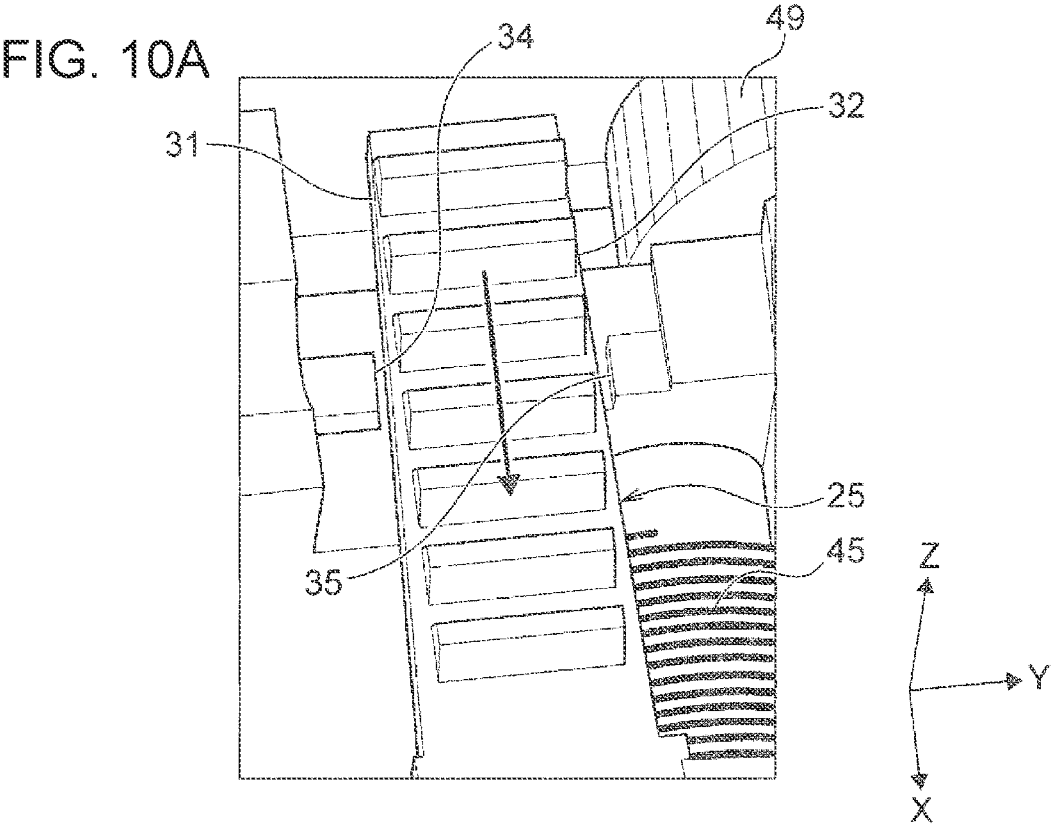
FIGS. 10A and 10B are a perspective view and an enlarged perspective view of a main portion of the rotation stopping section according to the first embodiment.
Figure 10B:
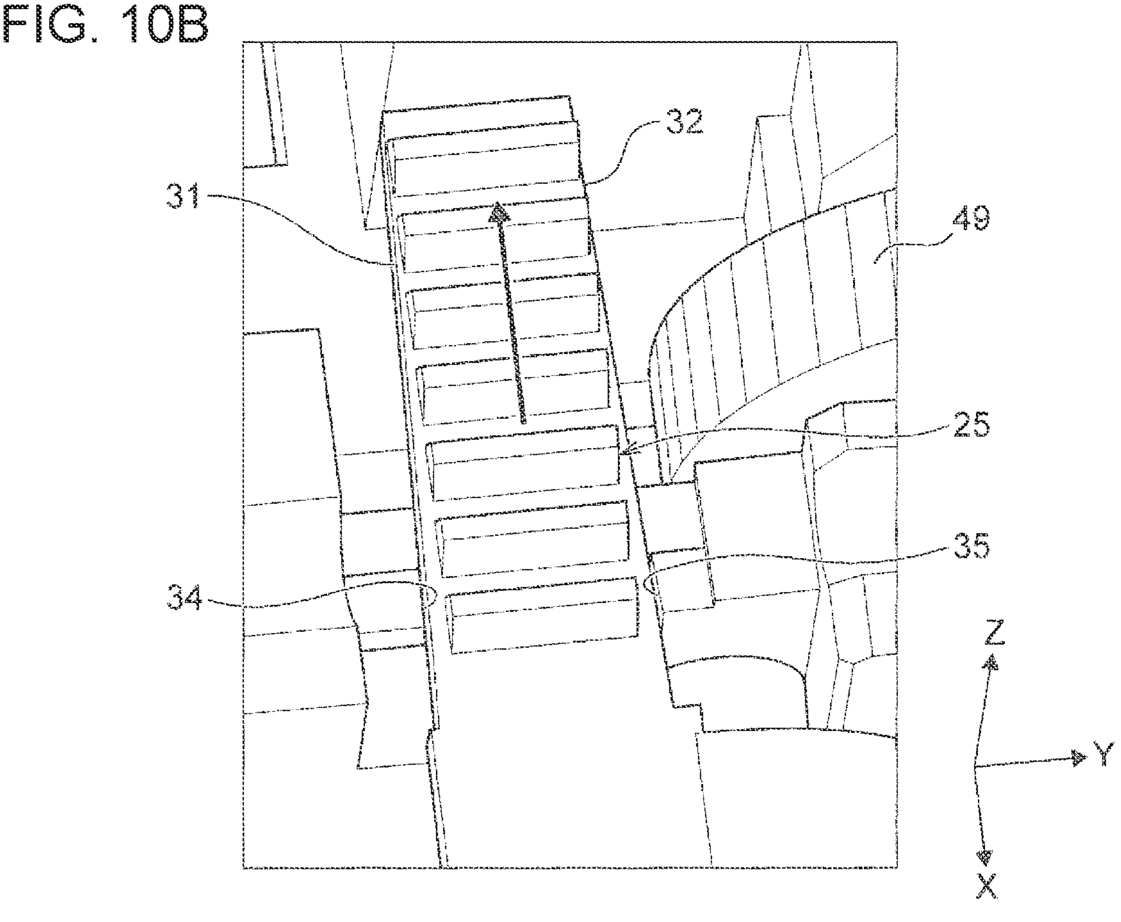

Further, when the rotation stopping section 23 is separated from the position (FIG. 6A) at which the rotation of the friction gear 9 is stopped in a state where the rotation stopping section 23 is displaced as described above, the power of the carriage 2 supports the spring force of the spring member 22 for the switching lever section as described above (FIG. 6B). As a result, the rotation stopping section 23 is separated from the friction gear 9 without being affected by the displacement. Then, the rotation stopping section 23 moves in the separation direction and stops at a position where both the tapers 31 and 32 of the second rack portion 25 come into contact with the contacted portions 34 and 35 (FIG. 9B). Thereby, the displacement of the rotation stopping section 23 is corrected. That is, when the rotation stopping section 23 moves after the displacement of the rotation stopping section 23 is corrected (FIGS. 7A and 7B), the displacement is corrected, and thus, the lateral pressure is not affected (FIGS. 10A and 10B).

Switching Between Power Non-Transmission State and Power Transmission State by Switching Lever Section and Holding Portion In the power non-transmission state illustrated in FIGS. 4A and 6A, the pin 13 is in the first cam position 17, and the switching lever section 10 is pulled in the −X direction by the spring force of the spring member 22 for the switching lever section and pressed against a weir 54 of the holding portion 11. That is, the switching lever section 10 is held at the first cam position 17 in a state where the pin 13 is pressed against the weir 54.

In this state, when the carriage 2 moves in the +X direction and comes into contact with a carriage contact portion 40 of the switching lever section 10 to push the switching lever section 10, the switching lever section 10 moves and the pin 13 moves from the first cam position 17 of the holding portion 11 to the second cam position 18.

During this movement, as illustrated in FIG. 6B, the second rack portion 25 of the rotation stopping section 23 receives power from the carriage 2, that is, receives the power through the first rack portion 24 and the release gear 26, and moves in the −X direction. As a result, the rotation stopping section 23 receives the support of the power of the carriage 2 in addition to the spring force of the spring member 22 for the switching lever section and moves in the −X direction, and is separated from the position where the rotation of the friction gear 9 is stopped.

Subsequently, when the carriage 2 moves in the −X direction and separated from the switching lever section 10, the switching lever section 10 receives the spring force of the spring member 22 for the switching lever section and moves in the −X direction as illustrated in FIG. 7A. At this time, the pin 13 moves from the second cam position 18 to the third cam position 19.

As a result, the first rack portion 24 of the switching lever section 10 moves in the −X direction. This movement causes the release gear 26 to rotate in the opposite direction, and the second rack portion 25 moves in the +X direction. That is, the rotation stopping section 23 moves to the position where the rotation of the friction gear 9 is stopped.

Further, as illustrated in FIG. 7B, the switching lever section 10 receives the spring force of the spring member 22 for the switching lever section and moves in the −X direction. The pin 13 moves from the third cam position 19 to the fourth cam position 20. The rotation stopping section 23 is pushed by the switching lever section 10, moves in the −X direction, and is separated from the friction gear 9. At the same time, a movable transmission gear 42, which will be described later, meshes with the friction gear 9 to enter the power transmission state. At this time, the release gear 26 idles.

The shaft 27 to which the switching lever section 10 is attached so as to be movable in the X-axis direction is provided with the movable transmission gear 42 which is movable in the same direction. The movable transmission gear 42 rotates integrally with the shaft 27, but is provided movably in the axial direction.

In the power transmission state, the movable transmission gear 42 meshes with the friction gear 9 (FIGS. 5 and 7B). In the power non-transmission state, the movable transmission gear 42 does not mesh with the friction gear 9 (FIGS. 4A and 7A).

The movable transmission gear 42 is pressed against a partition portion 44 of the switching lever section 10 by the compression spring 43 in the −X direction. The partition portion 44 is located between the rotation stopping section 23 and the movable transmission gear 42. Meanwhile, the rotation stopping section 23 is pressed against the partition portion 44 by another compression spring 45 in the +X direction.

That is, the movable transmission gear 42 and the rotation stopping section 23 receive constantly a force in the direction of coming into contact with the partition portion 44 of the switching lever section 10 by the spring forces of the compression spring 43 and the compression spring 45.

Power Transmission Path from Motor to Medium Receiving Tray

As illustrated in FIGS. 1 to 3B, the medium receiving tray 5 has a rack 46 formed thereon. A pinion 48 attached to one end of a tray drive shaft 47 meshes with the rack 46. A gear 49 at the other end of the tray drive shaft 47 meshes with a gear 51 that rotates integrally with a shaft 50 of the friction gear 9 located at the most downstream end of the power transmission path member 8. The friction gear 9 is pressed against a flange 53 of the shaft 50 by receiving the spring force of the compression spring 52.

The friction gear 9 rotates integrally with the shaft 50 due to a frictional force generated between the friction gear 9 and the flange 53 of the shaft 50. When a force larger than the frictional force acts in a state where the friction gear 9 meshes with the rotation stopping section 23, the friction gear 9 does not rotate while resisting the frictional force, and only the shaft 50 rotates.

When the movable transmission gear 42 is in a position to mesh with the friction gear 9, the power of the motor 6 is transmitted through the power transmission path member 8 and the friction gear 9 rotates. When the friction gear 9 rotates, the power of the motor 6 is transmitted to the rack 46 via the gear 51, the gear 49 and the pinion 48. This causes the medium receiving tray 5 to move.

Displacement Correction of Rotation Stopping Section by Taper of Second Rack Portion and Contacted Portion As illustrated in FIG. 6A and FIGS. 8A and 8B, in a state where the rotation stopping section 23 is located at a position at which the rotation of the friction gear 9 is stopped, when an external force is applied to the medium receiving tray 5, the lateral force is generated between the friction gear 9 and the locking tooth 29 of the rotation stopping section 23, and the displacement force for displacing the rotation stopping section 23 acts. In a state where the rotation stopping section 23 is displaced by the displacement force (FIG. 9A), when the rotation stopping section 23 is separated from the position where the rotation of the friction gear 9 is stopped, the power of the carriage 2 supports the spring force of the spring member 22 for the switching lever section (FIG. 6B). As a result, the rotation stopping section 23 is separated from the friction gear 9 without being affected by the displacement.

The rotation stopping section 23 moves in the separation direction and stops at a position where both the tapers 31 and 32 of the second rack portion 25 come into contact with the contacted portions 34 and 35 (FIG. 9B). As a result, the displacement of the rotation stopping section 23 is corrected. When the rotation stopping section 23 moves after the displacement of the rotation stopping section 23 is corrected, since the displacement has been corrected as illustrated in FIGS. 10A and 10B, the rotation stopping section 23 can move without being affected by the lateral pressure.

Description of Effects of Embodiment (1) According to the recording device 1 of the present embodiment, the switching lever section 10 receives the power of the carriage 2 and moves to switch the power transmission section 7 between the power non-transmission state and the power transmission state. Moreover, the holding portion 11 for holding the position of the switching lever section 10 is provided. Therefore, since the position of the switching lever section 10 is held by the holding portion 11, each state of the power non-transmission state and the power transmission state can be stably held.

(2) In addition, according to the present embodiment, the pin 13 moves in one direction D on the circumferential locus 14 while coming into contact with the cam surface 15 of the cam portion 16, and thus, the power transmission section 7 is switched between the power non-transmission state and the power transmission state. Accordingly, switching between the power non-transmission state and the power transmission state by the switching lever section can be realized with a simple configuration.

(3) According to the present embodiment, the cam portion 16 is formed so that the pin 13 can move on the circumferential locus 14 only in the direction in the order of the first cam position 17, the second cam position 18, the third cam position 19, the fourth cam position 20, and then the first cam position 17. As a result, switching between the power non-transmission state and the power transmission state by the switching lever section 10 and holding of each state can be realized with a simple configuration.

(4) Further, according to the present embodiment, switching between the power non-transmission state and the power transmission state by the switching lever section 10 and the holding of each state can be easily realized by the power of the carriage 2 and the spring force of the spring member 22 for the switching lever section.

(5) According to the present embodiment, the power non-transmission state is created when the pin 13 of the switching lever section 10 comes into contact with the first cam position 17, and the power transmission state is created when the pin 13 comes into contact with the fourth cam position 20. As a result, switching between the power non-transmission state and the power transmission state by the switching lever section 10 and the holding of each state can be realized with a simple configuration.

(6) In addition, according to the present embodiment, the rotation stopping section 23 is provided, which moves to the position at which the rotation of the friction gear 9 is stopped in the power non-transmission state and is separated from a position at which the rotation of the friction gear 9 is stopped in the power transmission state. As a result, the rotation stopping section 23 stops the rotation of the friction gear 9 in the power non-transmission state, and thus, the possibility of the medium receiving tray 5 moving unintentionally due to its own weight or other causes can be reduced.

(7) According to the present embodiment, when the switching lever section 10 moves by the carriage 2 and the pin 13 moves from the first cam position 17 to the second cam position 18, the first rack portion 24 rotates the release gear 26 by the movement. Then, the rotation of the release gear 26 causes the second rack portion 25 to move in the direction opposite to the first rack portion 24, thereby separating the rotation stopping section 23 from the position where the rotation of the friction gear 9 is stopped. As a result, even when the spring force of the spring member 22 for the switching lever section is set to be small, the power of the carriage 2 can support the spring force of the spring member 22 for the switching lever section, and thus, it is possible to increase certainty of separating the rotation stopping section 23 from the position where the rotation of the friction gear 9 is stopped.

(8) According to the present embodiment, when the pin 13 moves from the second cam position 18 to the third cam position 19, the first rack portion 24 rotates the release gear 26 in the opposite direction, and the rotation of the release gear 26 causes the second rack portion 25 to move in the opposite direction to move the rotation stopping section 23 to the position where the rotation of the friction gear 9 is stopped. Furthermore, when the pin 13 moves from the third cam position 19 to the fourth cam position 20, the first rack portion 24 is separated from the release gear 26, the second rack portion 25 is pushed and moves by the switching lever section 10, and thus, separates the rotation stopping section 23 from the position where the rotation of the friction gear 9 is stopped. As a result, even when the spring force of the spring member 22 for the switching lever section is set to be small, the power of the carriage 2 can support the spring force, and thus, it is possible to increase certainty of separating the rotation stopping section 23 from the position where the rotation of the friction gear 9 is stopped.

(9) In addition, according to the present embodiment, even when the rotation stopping section 23 is displaced by an external force applied to the medium receiving tray 5, one of the tapers 31 and 32 of the second rack portion 25 comes into contact with one of the contacted portions 34 and 35 and stops, and thus, further displacement can be suppressed.

Further, in the displaced state, when the rotation stopping section 23 is separated from the position where the rotation of the friction gear 9 is stopped, the power of the carriage 2 supports the spring force of the spring member 22 for the switching lever section, and thus, the rotation stopping section 23 is separated from the friction gear 9 without being affected by the displacement. Then, the rotation stopping section 23 moves in the separation direction and stops at a position where both the tapers 31 and 32 of the second rack portion 25 come into contact with the contacted portions 34 and 35. As a result, the displacement of the rotation stopping section is corrected. Therefore, when the rotation stopping section 23 moves after the displacement of the rotation stopping section is corrected, the rotation stopping section 23 can move without being affected by the lateral pressure.

As described above, the ejection tray is switched between driving and non-driving with a simple configuration that only operates the carriage and the carriage moves to a predetermined position while being separated from the switching section, and thereafter, the medium receiving tray 5 can take the first state and the second state displaced from the first state in the ejection direction F of the medium P.

Second Embodiment

Next, a recording device according to a second embodiment will be described with reference to FIGS. 11 to 15. The same reference numerals are assigned to the same parts as in the first embodiment, and the description thereof will be omitted.

Figure 11:
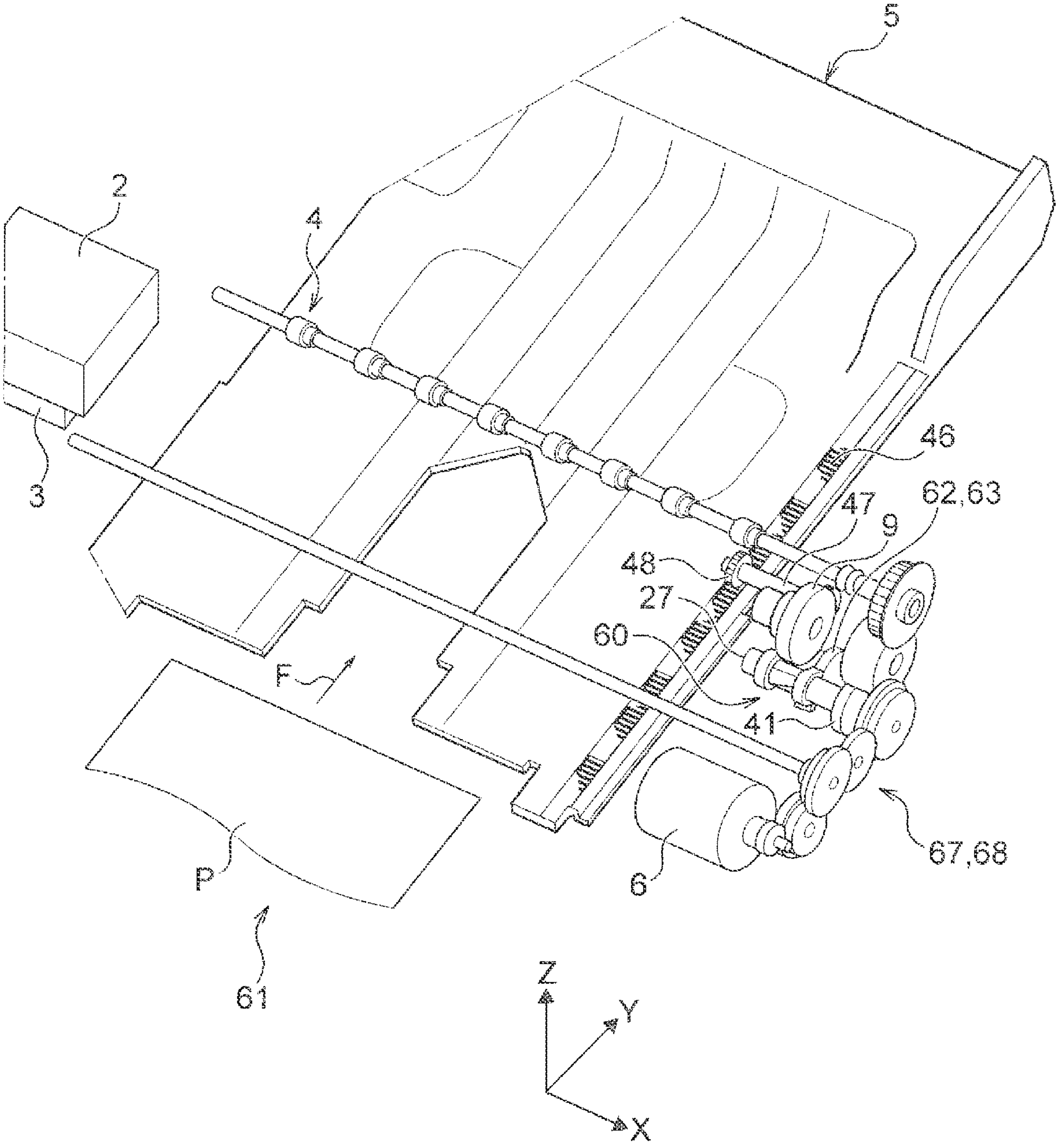
FIG. 11 is a perspective view of a main portion of a medium receiving tray portion of a recording device according to a second embodiment.
Figure 12:
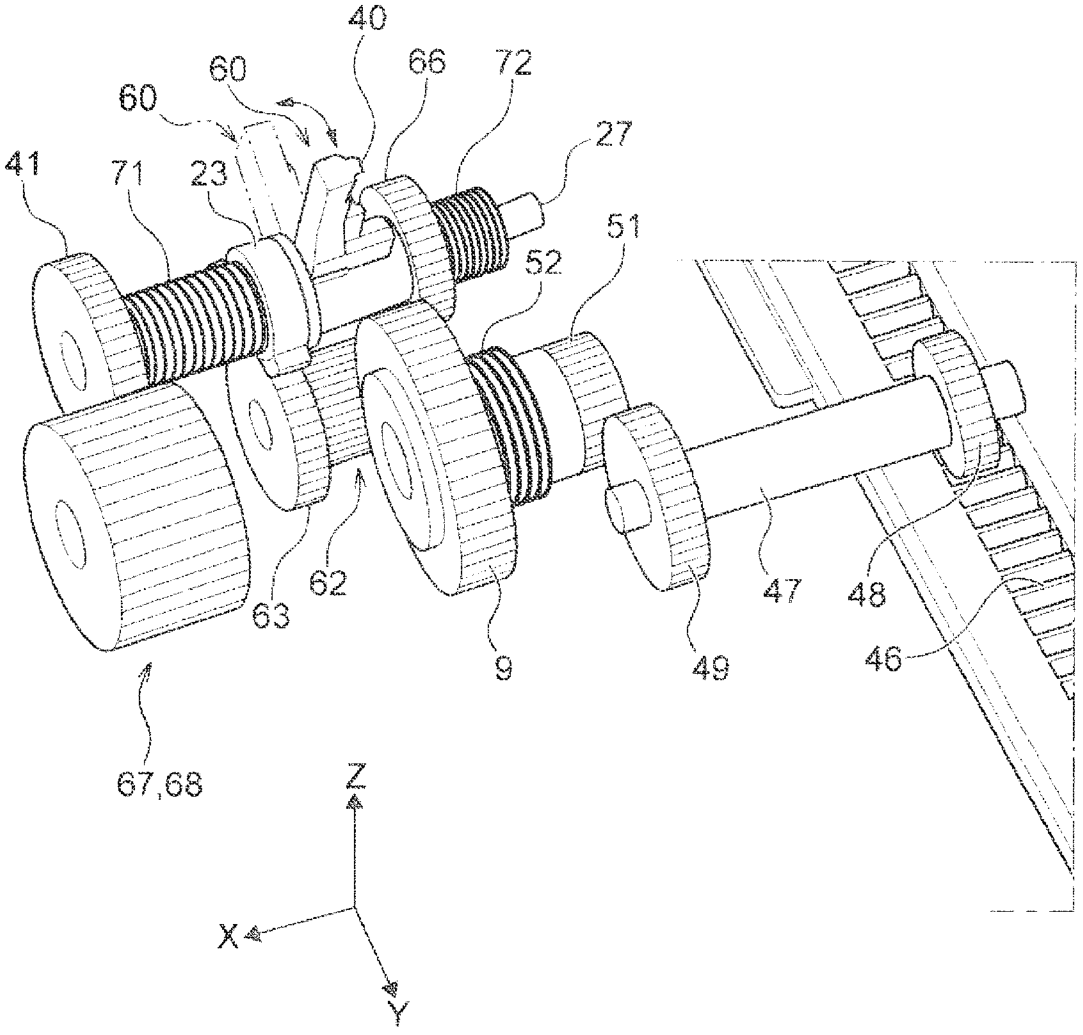
FIG. 12 is an enlarged perspective view of a power non-transmission state of the switching lever section according to the second embodiment.

As illustrated in FIGS. 11 and 12, a recording device 61 according to the present embodiment includes a recording head 3 that performs recording on a medium P mounted on a reciprocating carriage 2, an ejection roller 4 that ejects the recorded medium P, and a medium receiving tray 5 that receives the medium P ejected by the ejection roller 4, and the medium receiving tray 5 can take a first state and a second state displaced in an ejection direction F of medium P from the first state.

Furthermore, the recording device 61 includes a motor 6 that is the power source of the ejection roller 4, a power transmission section 67 that takes a power transmission state in which power of the motor 6 is transmitted from the motor 6 to the medium receiving tray 5 and a power non-transmission state in which the power of the motor 6 is not transmitted from the motor 6 to the medium receiving tray 5 and includes a friction gear 9 as a power transmission path member 68, a switching lever section 60 that moves by the power of the carriage 2 to switch the power transmission section 67 between the power non-transmission state and the power transmission state, and a transmission direction switching section 62 that switches the power transmission section 67 between the power non-transmission state and the power transmission state by moving the carriage 2 in one direction.

The transmission direction switching section 62 is arranged upstream of the friction gear 9 as the power transmission path member 68 in a power transmission direction.

The switching lever section 60 is attached to a shaft 27 so as to be movable in an axial direction (X-axis direction). As in the first embodiment, the shaft 27 has a transmission gear 41 forming a transmission gear group as the power transmission path member 68 and is rotatably attached to a structural member (not illustrated) such as a frame of the recording device 61. A drive gear 66, which will be described later, is attached to the shaft 27 so as to be movable in the X-axis direction. The drive gear 66 is configured to rotate integrally with the shaft 27.

The power transmission state to the friction gear 9 via the transmission direction switching section 62 is switched depending on the position to which the drive gear 66 moves.

The power of the motor 6 is transmitted to the transmission gear 41 through the transmission gear group of the power transmission path member 68 to rotate the shaft 27, as illustrated in FIG. 11. By changing the position of the drive gear 66 in a state where the shaft 27 rotates in one direction, the rotation direction of the friction gear 9 is switched.

The power transmission structure from the friction gear 9 to the rack 46 of the medium receiving tray 5 is the same as in the first embodiment. Further, the power transmission structure from the motor 6 to the transmission gear 41 may be any structure as long as the power of the motor 6 is transmitted to the transmission gear 41, and is substantially the same as the first embodiment. Of course, they may be different from each other.

Figure 13:
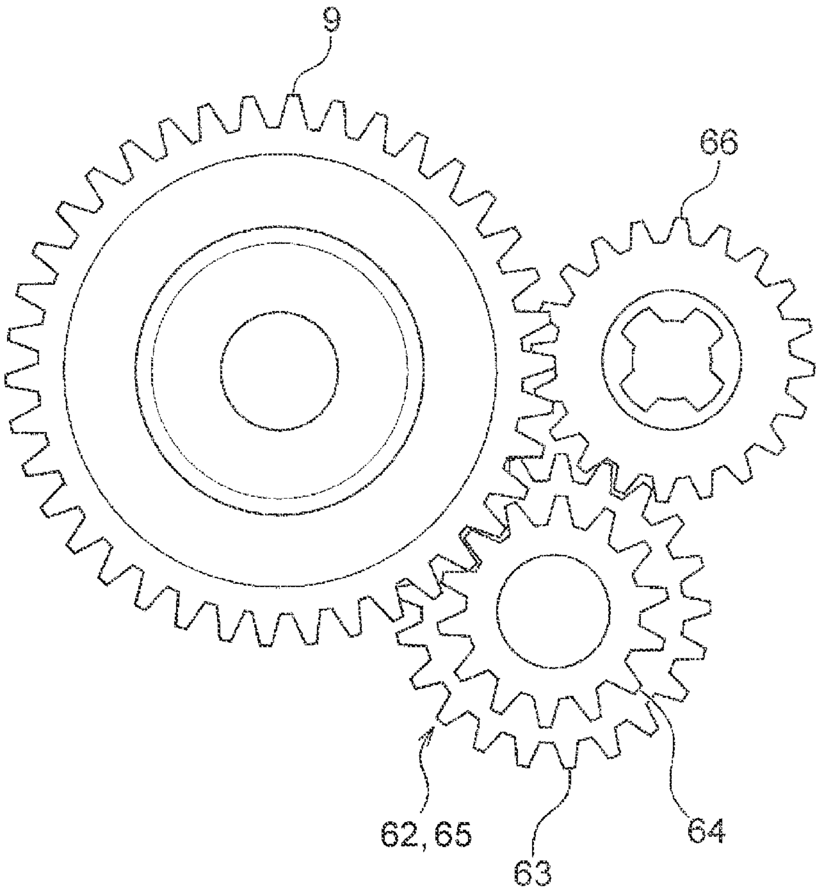
FIG. 13 is an enlarged side view of a portion of a compound gear according to the second embodiment.

Further, as illustrated in FIG. 13, according to the present embodiment, the transmission direction switching section 62 is a compound gear 65 having a first gear 63 and a second gear 64. The compound gear 65 is configured such that the second gear 64 always meshes with the friction gear 9.

Here, the first gear 63 is a large gear with a large diameter, and the second gear 64 is a small gear with a diameter smaller than that of the first gear 63.

Figure 14:
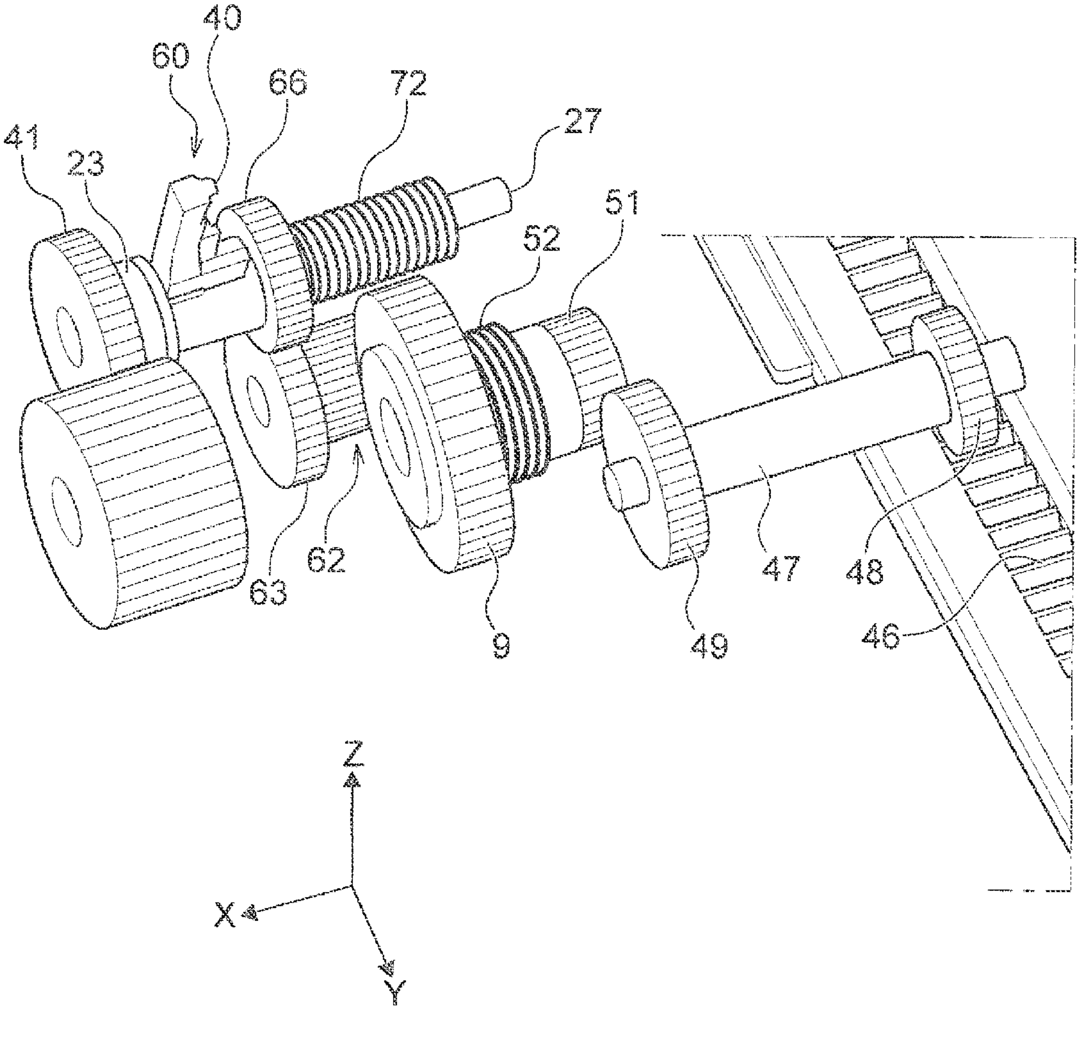
FIG. 14 is an enlarged perspective view of an open power transmission state of the switching lever section according to the second embodiment.
Figure 15:
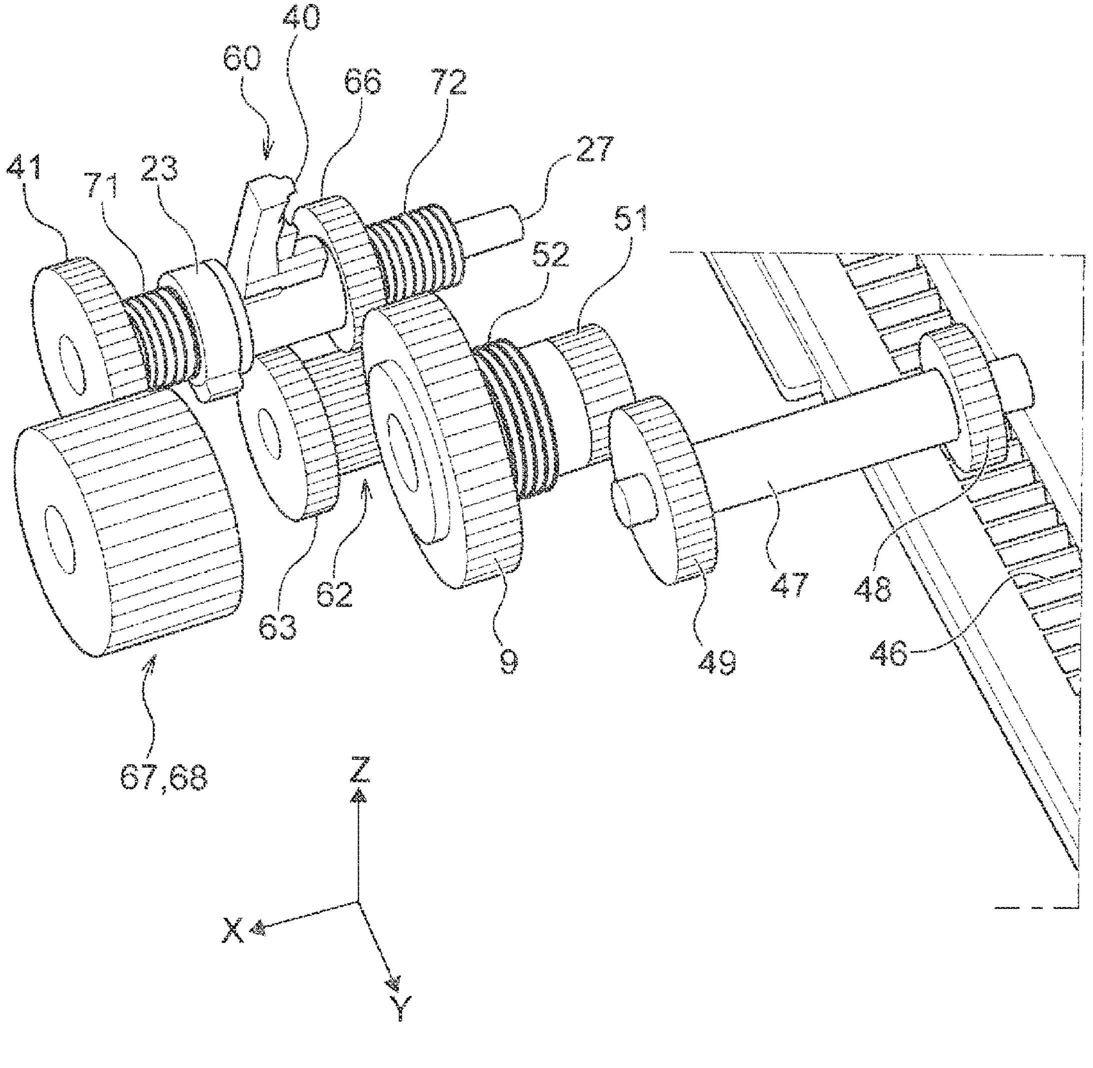
FIG. 15 is an enlarged perspective view of a closed power transmission state of the switching lever section according to the second embodiment.

Then, as illustrated in FIGS. 12, 14, and 15, the drive gear 66 that transmits the power of the motor 6 moves as the switching lever section 60 moves in the X-axis direction.

Depending on the position to which the drive gear 66 moves, it is configured to take the power non-transmission state illustrated in FIG. 12, an open power transmission state (FIG. 14) in which the medium receiving tray 5 moves in the direction from the first state to the second state, and a closed power transmission state (FIG. 15) in which the medium receiving tray 5 moves in the direction from the second state to the first state.

In addition, as illustrated in FIGS. 12, 14, and 15, according to the present embodiment, the switching lever section 60 is pushed by a first spring 71 and a second spring 72 located on both sides in the moving direction (X-axis direction). Both the first spring 71 and the second spring 72 are composed of compressed coil springs. The drive gear 66 is located between the switching lever section 60 and the second spring 72 and is pressed against the switching lever section 60 by the second spring 72.

Further, a spring force of the first spring 71 is set to be greater than a spring force of the second spring 72. Thus, in a state where the switching lever section 60 is released from the power of the carriage 2, the switching lever section 60 is located in the power non-transmission state (FIG. 12).

Further, as illustrated in FIGS. 12, 14 and 15, according to the present embodiment, a rotation stopping section 23 is movably provided between the first spring 71 and the switching lever section 60. The rotation stopping section 23 is attached to the shaft 27 so as to be movable in the axial direction of the shaft 27 (X-axis direction) but not to rotate around the shaft.

The rotation stopping section 23 is pressed against the switching lever section 60 by the first spring 71. The rotation stopping section 23 moves to a position at which the rotation stopping section 23 meshes with the first gear 63 of the compound gear 65 in the power non-transmission state, and moves to a position at which the rotation stopping section 23 does not mesh with the first gear 63 in the power transmission state. That is, in the power transmission state, the rotation stopping section 23 moves to a position at which the rotation stopping section 23 does not mesh with other gears.

Further, as illustrated in FIG. 12, according to the present embodiment, in a state where the switching lever section 60 is pushed by the first spring 71 and the second spring 72 from both sides in the moving direction (X-axis direction), the switching lever section 60 receives the power of the carriage 2 and can move in the axial direction of the shaft 27 and can rotate around the shaft. That is, when the shaft 27 rotates, the switching lever section 60 rotates together by the frictional force.

When the shaft 27 rotates, the switching lever section 60 rotates integrally by the frictional force. However, when the switching lever section 60 is regulated by a force greater than the frictional force, the switching lever section 60 stops rotating while resisting the frictional force even when the shaft 27 rotates.

When being in the power non-transmission state, the switching lever section 60 is located at a tilted position as indicated by dashed lines in FIG. 12. In other words, in the power non-transmission state, the carriage contact portion 40 of the switching lever section 60 is retracted from the movement range of the carriage 2.

When shifting from the power non-transmission state to the power transmission state, the shaft 27 rotates to change the switching lever section 60 from the tilted position (dashed line) to the standing position (solid line) in FIG. 12. The switching lever section 60 is configured to rotate integrally with the shaft 27 from the tilted position, and to stop at the position by coming into contact with a restricting portion (not illustrated) in the standing position.

A more specific description will be given, though a part of the descriptions will be repeated.

Since the switching lever section 60 can take the tilted position (dashed line) and the standing position (solid line) in FIG. 12, it is possible to arrange the carriage contact portion 40 of the switching lever section 60 in the movement range when the carriage 2 moves outside the range during the recording operation, for example, for self-position re-recognition other than during the recording operation.

When shifting to the open power transmission state (FIG. 14) or the closed power transmission state (FIG. 15) of the medium receiving tray 5, the switching lever section 60 is put in a standing state, and the carriage 2 moving to the carriage contact portion 40 comes into contact with the switching lever section 60.

Meanwhile, when the carriage 2 performs the self-position re-recognition operation, or the like, by rotating the shaft 27 in the opposite direction, the switching lever section 60 rotates together, and the carriage contact portion 40 does not come into contact with the carriage 2 by tilting and retreating from the standing state.

Switching Between Power Non-Transmission State, Open Power Transmission State, and Closed Power Transmission State As illustrated in FIG. 12, in the power non-transmission state, the switching lever section 60 which is in the tilted state (dashed line) is brought into the standing state (solid line) by rotating the shaft 27. Next, the carriage 2 moves in the +X direction and comes into contact with the carriage contact portion 40 of the switching lever section 60 and pushed to move the switching lever section 60 in the +X direction.

When shifting to the open power transmission state, the carriage 2 moves to the position illustrated in FIG. 14. That is, the rotation stopping section 23 moves to a position where the rotation stopping section 23 does not mesh with the first gear 63 of the compound gear 65, and the movement of the carriage 2 stops at the position where the drive gear 66 meshes with the first gear 63. In this state, the rotation of the shaft 27 is transmitted from the drive gear 66 to the first gear 63 of the compound gear 65, and transmitted to the friction gear 9 from the second gear 64 rotating integrally.

Thereafter, the rotation is transmitted to the rack 46 of the medium receiving tray 5 via the gear 51, the gear 49, and the pinion 48, and the medium receiving tray 5 moves in the +Y direction. That is, the medium receiving tray 5 moves from the accommodated position within the recording device 61 to the position for receiving the medium P to be ejected.

When shifting to the closed power transmission state, the carriage 2 moves to the position illustrated in FIG. 15. That is, the rotation stopping section 23 moves to the position where the rotation stopping section 23 does not mesh with the first gear 63 of the compound gear 65, and the carriage 2 stops at a position where the drive gear 66 meshes with the friction gear 9. The rotation of the shaft 27 is directly transmitted from the drive gear 66 to the friction gear 9 in that state. In this state, power is not transmitted to the compound gear 65 from the drive gear 66, and thus, the compound gear 65 is in an idle state. Since the rotation of the drive gear 66 is transmitted directly to the friction gear 9 without going through the compound gear 65, the rotation direction of the friction gear 9 is opposite to the direction in the open power transmission state.

Thereafter, the rotation is transmitted to the rack 46 of the medium receiving tray 5 via the gear 51, the gear 49, and the pinion 48, and thus, the medium receiving tray 5 moves in the −Y direction. That is, the medium receiving tray 5 moves back to an accommodated position within the recording device 61.

The switching between the power non-transmission state, the open power transmission state, and the closed power transmission state is performed by a control portion (not illustrated) provided in the recording device 61. That is, the control portion executes the following (1) to (4).

(1) The control section rotates the shaft 27 to move the switching lever section 60 from the retracted state (dashed line in FIG. 12) to the standing state (solid line in FIG. 12).

(2) Subsequently, the switching lever section 60 in the standing state is pushed by the carriage 2, and moves to the position of the open power transmission state or the position of the closed power transmission state.

(3) Then, in a state where the switching lever section 60 is pressed by the carriage 2, the operation of the open power transmission state or the operation of the closed power transmission state is executed.

(4) Subsequently, the carriage 2 is released from the switching lever section 60, the shaft 27 rotates in the opposite direction, and the switching lever section 60 is returned to the retracted state.

Description of Effects of Embodiment (1) According to the recording device 61 of the present embodiment, the switching lever section 60 receives the power of the carriage 2 and performs switching between the power non-transmission state and the power transmission state. Then, the transmission direction switching section 62 which moves the carriage 2 in one direction (+X-axis direction) to perform switching between the power non-transmission state and the power transmission state is provided, the transmission direction switching section 62 is arranged upstream of the friction gear 9 as the power transmission path member 68 in the power transmission direction. As a result, in the switching between the power non-transmission state and the power transmission state, the medium receiving tray 5 can take the first state and the second state displaced in the ejection direction F of the medium P from the first state with a simple configuration in which the carriage 2 only moves in one direction. Moreover, a time of the switching can be shortened.

(2) Further, according to the present embodiment, the transmission direction switching section 62 is the compound gear 65 having a first gear 63 and a second gear 64, and the second gear 64 is in mesh with the friction gear 9 all the time. As the switching lever section 60 moves, the drive gear 66 that transmits the power of the motor 6 moves, and according to the position of the drive gear 66, it is configured to take the power non-transmission state, the open power transmission state in which the medium receiving tray 5 moves from the first state to the second state (FIG. 14), and the closed power transmission state in which the medium receiving tray 5 moves in the direction of the first state from the second state (FIG. 15).

As a result, the switching between the power non-transmission state and the power transmission state by the transmission direction switching section 62 can be realized with a simple configuration of the compound gear 65. In addition, depending on the position of the drive gear 66, the power non-transmission state, the open power transmission state, and the closed power transmission state can be easily realized.

(3) According to the present embodiment, the switching lever section 60 is pushed by the first spring 71 and the second spring 72 located on both sides in the moving direction (X-axis direction). Then, the spring force of the first spring 71 is greater than the spring force of the second spring 72. As a result, when the switching lever section 60 is released from the power of the carriage 2, the switching lever section 60 can automatically return to the position becoming the power non-transmission state by the spring force of the first spring 71.

In addition, since the drive gear 66 is meshed with other gears by the first spring 71 and the second spring 72, even when there is tooth contact, meshing occurs after half-tooth rotation, and thus, there is no need to retry meshing, and the time can be shortened.

(4) Further, according to the present embodiment, the rotation stopping section 23 is movably provided between the first spring 71 and the switching lever section 60. The rotation stopping section 23 is pressed against the switching lever section 60 by the first spring 71, moves to the position where the rotation stopping section 23 meshes with the first gear 63 of the compound gear 65 in the power non-transmission state, and moves to the position where the rotation stopping section 23 does not mesh with the first gear 63 in the power transmission state. As a result, the rotation stopping section 23 moves to the position where the rotation stopping section 23 meshes with the first gear 63 of the compound gear 65 in the power non-transmission state and stops the rotation of the compound gear 65, and thus, the possibility of the medium receiving tray 5 moving unintentionally due to its own weight or other causes can be reduced.

(5) In addition, according to the present embodiment, the switching lever section 60 is rotatable around the axis of the shaft 27, and when the shaft 27 rotates, the switching lever section 60 rotates integrally by frictional force. As a result, the carriage contact portion 40 pushed by the carriage 2 of the switching lever section 60 can be arranged within the movement range of the carriage 2. Therefore, it is possible to suppress an increase in size of the recording device 61 in a width direction.

Specifically, for example, it is possible to arrange the carriage contact portion 40 in the movement range when the carriage 2 moves outside the range during the recording operation for self-position re-recognition other than during the recording operation. When the medium receiving tray 5 is operated in the open power transmission state or the closed power transmission state, the switching lever section 60 is placed in a standing position so that the carriage 2 moves to come into contact with the carriage contact portion 40.

Meanwhile, when the carriage 2 performs the self-position re-recognition operation, or the like, by rotating the shaft 27 in the opposite direction, the switching lever section 60 rotates together, and the carriage contact portion 40 does not come into contact with the carriage 2 by tilting and retreating from the standing state.

OTHER EMBODIMENTS

The automatic opening mechanism 3 of the opening/closing cover and the printing device 1 according to the present disclosure are based on the configurations of the above-described embodiments. However, of course, it is possible to change or omit the partial configuration without departing from the gist of the present disclosure.

It is possible to apply the above disclosure to an object that may be manually operated, such as a paper support that is separate from the medium receiving tray.

What is claimed is:

1. A recording device, comprising:

a recording head that performs recording on a medium mounted on a carriage;

an ejection roller that ejects the medium on which the recording is performed;

a medium receiving tray that receives the medium ejected by the ejection roller, the medium receiving tray taking a first state and a second state displaced from the first state in an ejection direction of the medium;

a motor that is a power source of the ejection roller;

a power transmission section that takes a power transmission state in which power of the motor is transmitted to the medium receiving tray and a power non-transmission state in which the power of the motor is not transmitted to the medium receiving tray, the power transmission section including a friction gear as a power transmission path member;

a switching lever section that switches the power transmission section between the power non-transmission state and the power transmission state by movement of the carriage; and a holding portion that holds a position of the switching lever section, wherein the switching lever section has a pin projecting toward the holding portion, the holding portion has a cam portion, and when the pin moves at the cam portion in one direction, the power transmission switching section switches between the power non-transmission state and the power transmission state.

2. The recording device according to claim 1, wherein the cam portion has a first cam position, a second cam position, a third cam position, and a fourth cam position on a circumferential locus, the cam portion is pushed by a spring member for the holding portion in a direction in which the cam portion maintains a contact state with the pin, and the cam portion is formed so that the pin is configured to move only in a direction of order of the first cam position, the second cam position, the third cam position, the fourth cam position, and the first cam position on the circumferential locus.

3. The recording device according to claim 2, wherein the switching lever section moves by receiving power of the carriage and shifts from a state in which the pin comes into contact with the fourth cam position to a state in which the pin comes into contact with the first cam position and then a state in which the pin comes into contact with the second cam position, and after the switching lever section shifts to the state in which the pin comes into contact with the second cam position, when the switching lever section is released from the power of the carriage, the pin returns to the fourth cam position through the third cam position by a spring force of a spring member for the switching lever section.

4. The recording device according to claim 3, wherein the state in which the pin of the switching lever section comes into contact with the first cam position creates the power non-transmission state, and the state in which the pin comes into contact with the fourth cam position creates the power transmission state.

5. The recording device according to claim 2, further comprising a rotation stopping section that moves, in the power non-transmission state, to a position where a rotation of the friction gear is stopped and is separated, in the power transmission state, from the position where the rotation of the friction gear is stopped.

6. The recording device according to claim 5, further comprising:

a first rack portion that is provided in the switching lever section;

a second rack portion that is provided in the rotation stopping section; and a release gear that meshes with the first rack portion and the second rack portion, wherein when the switching lever section is moved by the carriage to move the pin from the first cam position to the second cam position, movement of the first rack portion rotates the release gear, the rotation of the release gear moves the second rack portion in a direction opposite to a moving direction of the first rack portion to cause the rotation stopping section to be separated from a position where the rotation of the friction gear is stopped.

7. The recording device according to claim 6, wherein when the switching lever section is released from power of the carriage and the pin moves from the second cam position to the third cam position, the first rack portion rotates the release gear in an opposite direction, and the rotation of the release gear moves the second rack portion in an opposite direction to move the rotation stopping section to the position where the rotation of the friction gear is stopped, and when the pin moves from the third cam position to the fourth cam position, the first rack portion is separated from the release gear, and the second rack portion is pushed and moves by the switching lever section to cause the rotation stopping section to be separated from the position where the rotation of the friction gear is stopped.

8. The recording device according to claim 7, further comprising:

a taper that is formed at a side surface of the second rack portion; and a contacted portion that takes, depending on a position where the second rack portion moves, a contact state in which the taper comes into contact and a non-contact state in which the taper does not come into contact, wherein the taper is in the non-contact state in a state in which the pin is at the first cam position, and the taper is in the contact state in a state in which the pin is at the fourth cam position.

9. A recording device, comprising:

a recording head that performs recording on a medium mounted on a carriage reciprocating between a first direction and a second direction opposite to the first direction;

an ejection roller that ejects the medium on which the recording is performed;

a medium receiving tray that receives the medium ejected by the ejection roller, the medium receiving tray taking a first state and a second state displaced from the first state in an ejection direction of the medium;

a motor that is a power source of the ejection roller;

a power transmission section that takes a power transmission state in which power of the motor is transmitted to the medium receiving tray and a power non-transmission state in which the power of the motor is not transmitted to the medium receiving tray, the power transmission section including a friction gear as a power transmission path member;

a switching lever section that switches the power transmission section between the power non-transmission state and the power transmission state by movement of the carriage; and a holding portion that holds a position of the switching lever section, wherein the carriage moves in the first direction when the switching lever section switches from the power non-transmission state to the power transmission state and when the switching lever section switches from the power transmission state to the power non-transmission state, the switching lever section has a pin projecting toward the holding portion, the holding portion has a cam portion, and when the pin moves at the cam portion in one direction, the power transmission switching section switches between the power non-transmission state and the power transmission state.

10. The recording device according to claim 9, wherein the cam portion has a first cam position, a second cam position, a third cam position, and a fourth cam position on a circumferential locus, the cam portion is pushed by a spring member for the holding portion in a direction in which the cam portion maintains a contact state with the pin, and the cam portion is formed so that the pin is configured to move only in a direction of order of the first cam position, the second cam position, the third cam position, the fourth cam position, and the first cam position on the circumferential locus.

11. The recording device according to claim 10, wherein the switching lever section moves by receiving power of the carriage and shifts from a state in which the pin comes into contact with the fourth cam position to a state in which the pin comes into contact with the first cam position and then a state in which the pin comes into contact with the second cam position, and after the switching lever section shifts to the state in which the pin comes into contact with the second cam position, when the switching lever section is released from the power of the carriage, the pin returns to the fourth cam position through the third cam position by a spring force of a spring member for the switching lever section.

12. The recording device according to claim 11, wherein the state in which the pin of the switching lever section comes into contact with the first cam position creates the power non-transmission state, and the state in which the pin comes into contact with the fourth cam position creates the power transmission state.

13. The recording device according to claim 10, further comprising a rotation stopping section that moves, in the power non-transmission state, to a position where a rotation of the friction gear is stopped and is separated, in the power transmission state, from the position where the rotation of the friction gear is stopped.

14. A recording device, comprising:

a recording head that performs recording on a medium mounted on a carriage reciprocating between a first direction and a second direction opposite to the first direction;

an ejection roller that ejects the medium on which the recording is performed;

a medium receiving tray that receives the medium ejected by the ejection roller, the medium receiving tray taking a first state and a second state displaced from the first state in an ejection direction of the medium;

a motor that is a power source of the ejection roller;

a power transmission section that takes a power transmission state in which power of the motor is transmitted to the medium receiving tray and a power non-transmission state in which the power of the motor is not transmitted to the medium receiving tray, the power transmission section including a friction gear as a power transmission path member;

a switching lever section that switches the power transmission section between the power non-transmission state and the power transmission state by movement of the carriage;

a holding portion that holds a position of the switching lever section; and a rotation stopping section that moves, in the power non-transmission state, to a position where a rotation of the friction gear is stopped and is separated, in the power transmission state, from the position where the rotation of the friction gear is stopped, wherein the rotation stopping section meshes with the friction gear in the power non-transmission state, the switching lever section has a pin projecting toward the holding portion, the holding portion has a cam portion, and when the pin moves at the cam portion in one direction, the power transmission switching section switches between the power non-transmission state and the power transmission state.

15. The recording device according to claim 14, wherein the cam portion has a first cam position, a second cam position, a third cam position, and a fourth cam position on a circumferential locus, the cam portion is pushed by a spring member for the holding portion in a direction in which the cam portion maintains a contact state with the pin, and the cam portion is formed so that the pin is configured to move only in a direction of order of the first cam position, the second cam position, the third cam position, the fourth cam position, and the first cam position on the circumferential locus.

16. The recording device according to claim 15, wherein the switching lever section moves by receiving power of the carriage and shifts from a state in which the pin comes into contact with the fourth cam position to a state in which the pin comes into contact with the first cam position and then a state in which the pin comes into contact with the second cam position, and after the switching lever section shifts to the state in which the pin comes into contact with the second cam position, when the switching lever section is released from the power of the carriage, the pin returns to the fourth cam position through the third cam position by a spring force of a spring member for the switching lever section.

17. The recording device according to claim 16, wherein the state in which the pin of the switching lever section comes into contact with the first cam position creates the power non-transmission state, and the state in which the pin comes into contact with the fourth cam position creates the power transmission state.

* * * * *